United States Patent
Saito et al.

(10) Patent No.: US 11,542,185 B2
(45) Date of Patent: Jan. 3, 2023

(54) RESISTIVITY ADJUSTMENT DEVICE AND RESISTIVITY ADJUSTMENT METHOD

(71) Applicant: DIC Corporation, Tokyo (JP)

(72) Inventors: Masato Saito, Ichihara (JP); Kazumi Oi, Ichihara (JP); Naoki Hada, Ichihara (JP)

(73) Assignee: DIC Corporation, Tokyo (JP)

( * ) Notice: Subject to any disclaimer, the term of this patent is extended or adjusted under 35 U.S.C. 154(b) by 997 days.

(21) Appl. No.: 16/324,973

(22) PCT Filed: Aug. 10, 2017

(86) PCT No.: PCT/JP2017/029164
§ 371 (c)(1),
(2) Date: Feb. 12, 2019

(87) PCT Pub. No.: WO2018/030525
PCT Pub. Date: Feb. 15, 2018

(65) Prior Publication Data
US 2019/0224633 A1 Jul. 25, 2019

(30) Foreign Application Priority Data
Aug. 12, 2016 (JP) .............................. JP2016-158664

(51) Int. Cl.
*C02F 1/68* (2006.01)
*B01F 23/231* (2022.01)
(Continued)

(52) U.S. Cl.
CPC .............. *C02F 1/685* (2013.01); *B01F 21/00* (2022.01); *B01F 23/23124* (2022.01);
(Continued)

(58) Field of Classification Search
CPC ..................................................... B01F 35/833
See application file for complete search history.

(56) References Cited

U.S. PATENT DOCUMENTS 6,158,721 A * 12/2000 Katou ................... B01F 23/232
261/DIG. 7
6,764,212 B1 7/2004 Nitta et al.
(Continued)

FOREIGN PATENT DOCUMENTS

CN 1228197 A 9/1999
CN 102024693 A 4/2011
(Continued)

OTHER PUBLICATIONS

Office Action dated Jan. 20, 2021, issued for Korean Patent Application No. 10-2020-7031356.
(Continued)

*Primary Examiner* — Lessanework Seifu
(74) *Attorney, Agent, or Firm* — Locke Lord LLP; James E. Armstrong, IV; Nicholas J. DiCeglie, Jr.

(57) ABSTRACT

A specific resistance value adjustment apparatus includes: a hollow fiber membrane module; a module passing pipe which passes through the hollow fiber membrane module; a bypassing pipe which bypasses the hollow fiber membrane module; a liquid discharge pipe which communicates with the module passing pipe and the bypassing pipe through a joint portion; a first flow rate detection unit which detects a first flow rate of a liquid flowing to at least one of a liquid supply pipe and the liquid discharge pipe; a control valve which opens and closes the module passing pipe; and a control unit which sets an opening degree of the control valve in response to the first flow rate detected by the first flow rate detection unit.

11 Claims, 13 Drawing Sheets

(51) Int. Cl.
*B01F 21/00* (2022.01)
*B01F 25/40* (2022.01)
*B01F 25/452* (2022.01)
*B01F 35/80* (2022.01)
*B01F 35/83* (2022.01)
*B01F 101/58* (2022.01)

(52) U.S. Cl.
CPC .......... *B01F 25/40* (2022.01); *B01F 25/4522* (2022.01); *B01F 35/80* (2022.01); *B01F 35/833* (2022.01); *C02F 1/68* (2013.01); *B01F 23/231244* (2022.01); *B01F 2101/58* (2022.01)

(56) References Cited

U.S. PATENT DOCUMENTS

| | | | |
|---|---|---|---|
| 8,590,548 B2 * | 11/2013 | Eshima | H01L 21/6708 134/84 |
| 2004/0012104 A1 | 1/2004 | Ozawa et al. | |
| 2011/0061683 A1 | 3/2011 | Eshima | |

FOREIGN PATENT DOCUMENTS

| | | | |
|---|---|---|---|
| JP | 2000-265945 A | | 9/2000 |
| JP | 2003-010660 A | | 1/2003 |
| JP | 3951385 B2 | | 8/2007 |
| JP | 2011-082495 A | | 4/2011 |
| JP | 2012-223725 A | | 11/2012 |
| JP | 5683697 B2 | | 3/2015 |
| KR | 10-0849978 B1 | | 8/2008 |
| KR | 10-2019-0028474 A | | 3/2019 |
| KR | 10-2020-0127051 A | | 11/2020 |
| TW | 201125029 A | | 7/2011 |
| WO | 02/085790 A2 | | 10/2002 |
| WO | 2016/042933 A1 | | 3/2016 |

OTHER PUBLICATIONS

Supplementary European Search Report dated Dec. 17, 2019, issued for the European Patent Application No. 17839589.3.
International Preliminary Report on Patentability dated Sep. 5, 2017, issued for PCT/JP2017/029164.
International Search Report dated Sep. 5, 2017, issued for issued for PCT/JP2017/029164.
Office Action dated Oct. 14, 2020, issued for Taiwanese Patent Application No. 106127214.
Office Action dated Feb. 3, 2021, issued for CN Patent Application No. 201780048310.2.

* cited by examiner

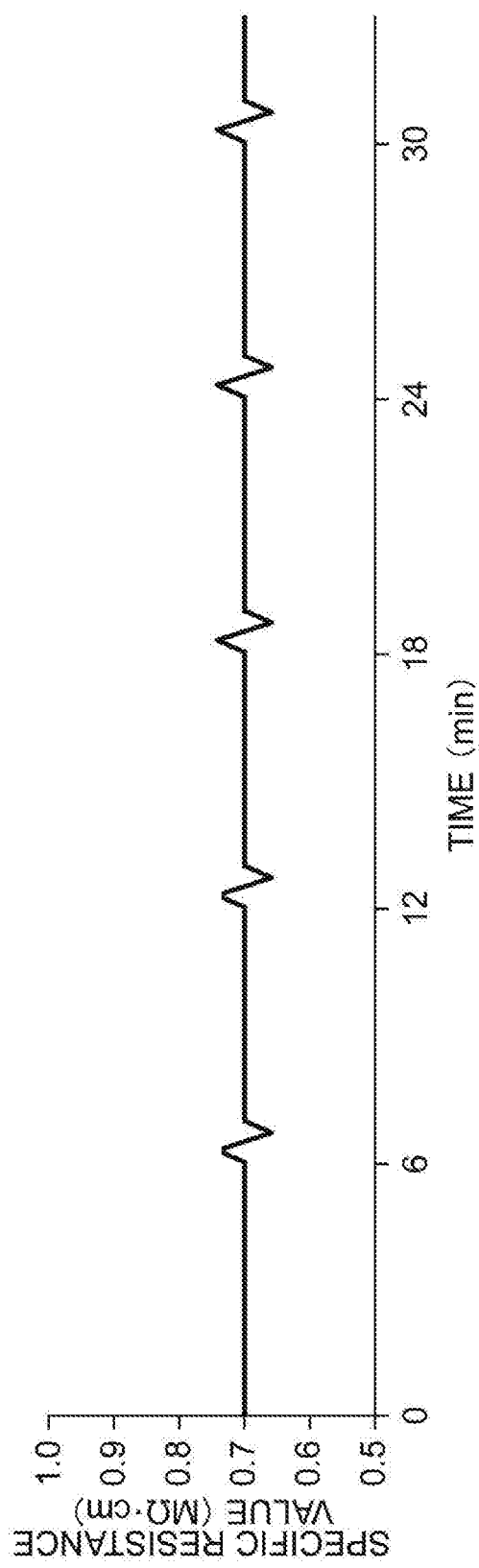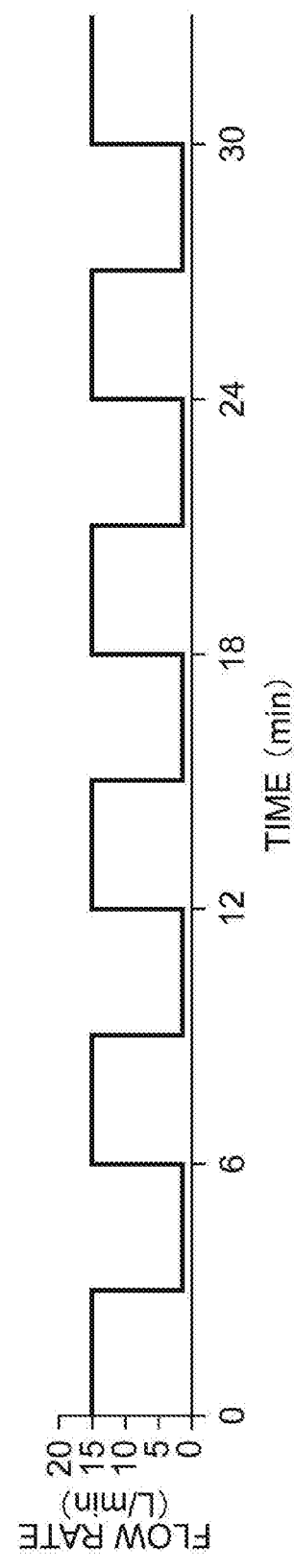
Fig. 8 (a)
Fig. 8 (b)

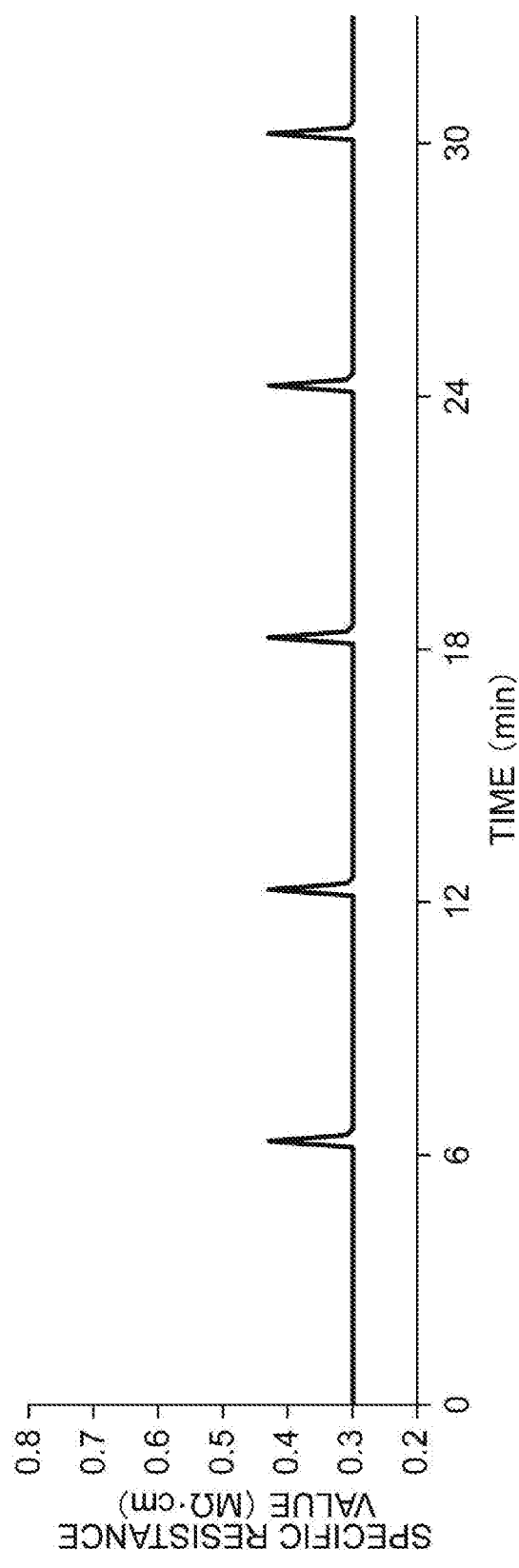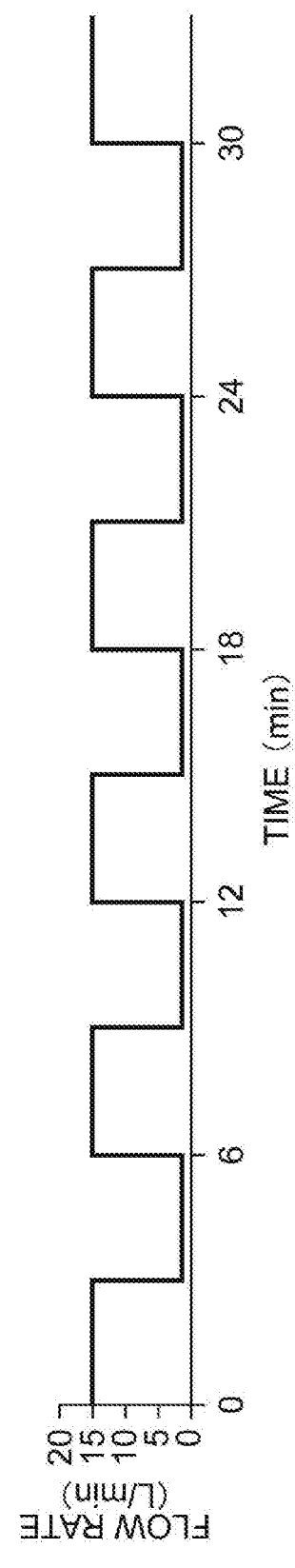
Fig. 9 (a)
Fig. 9 (b)

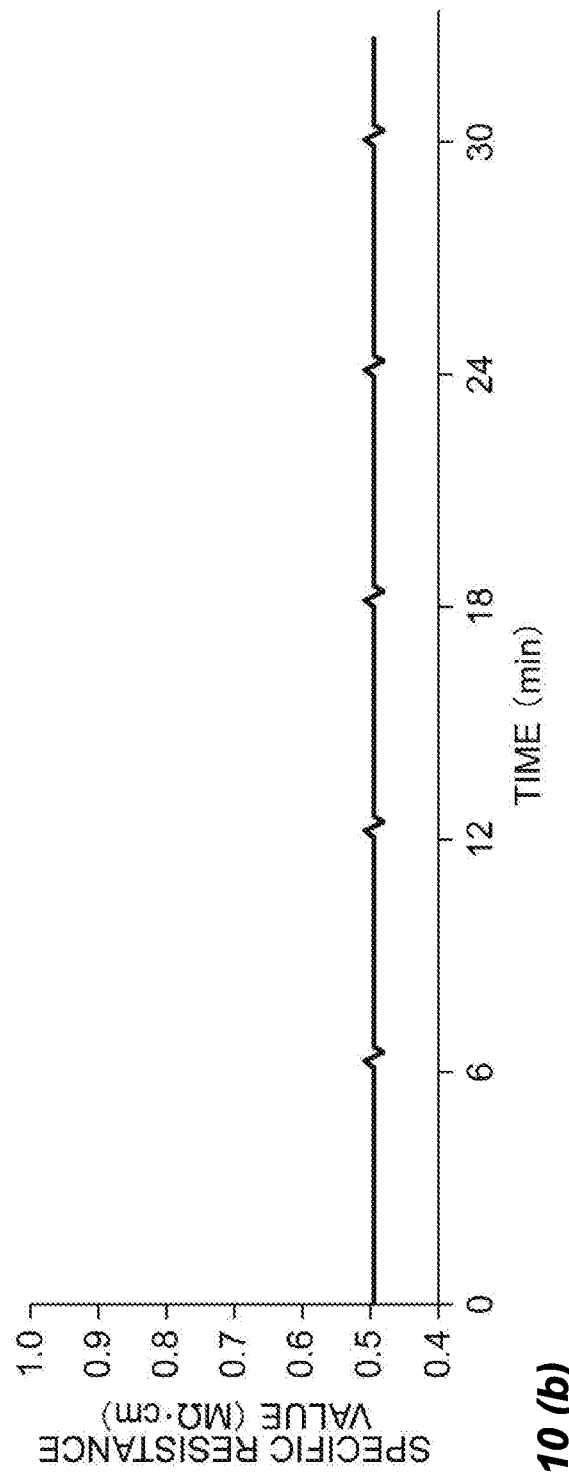
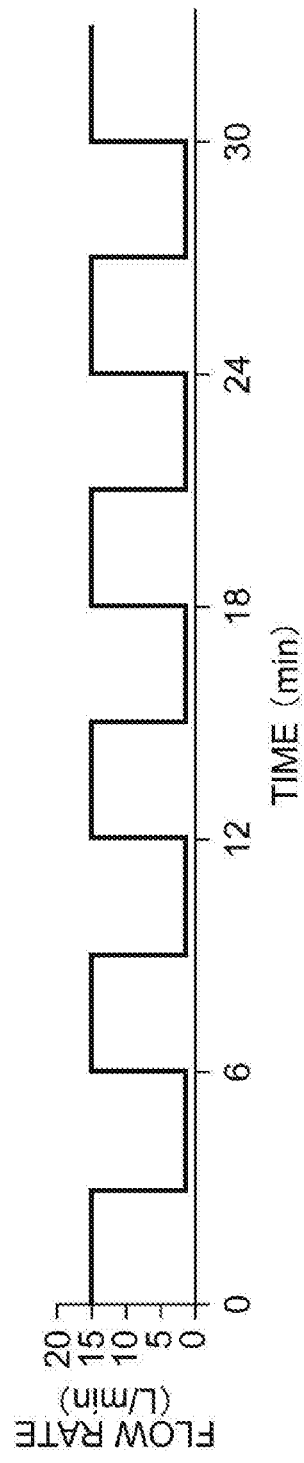
Fig. 10 (a)
Fig. 10 (b)

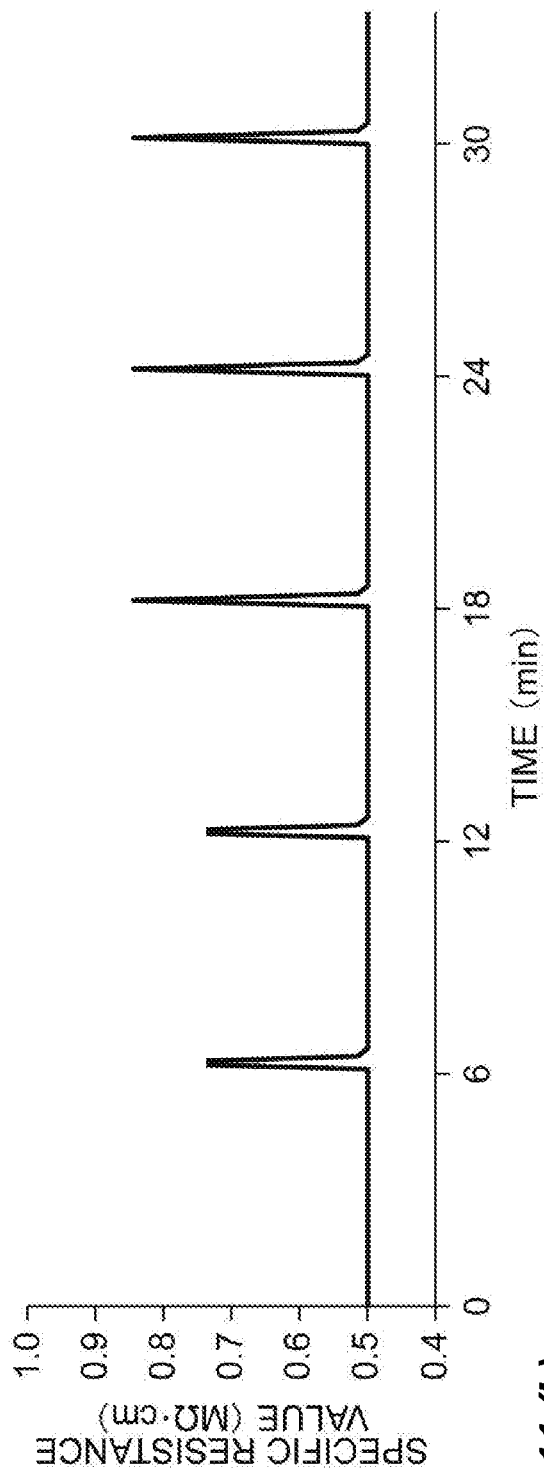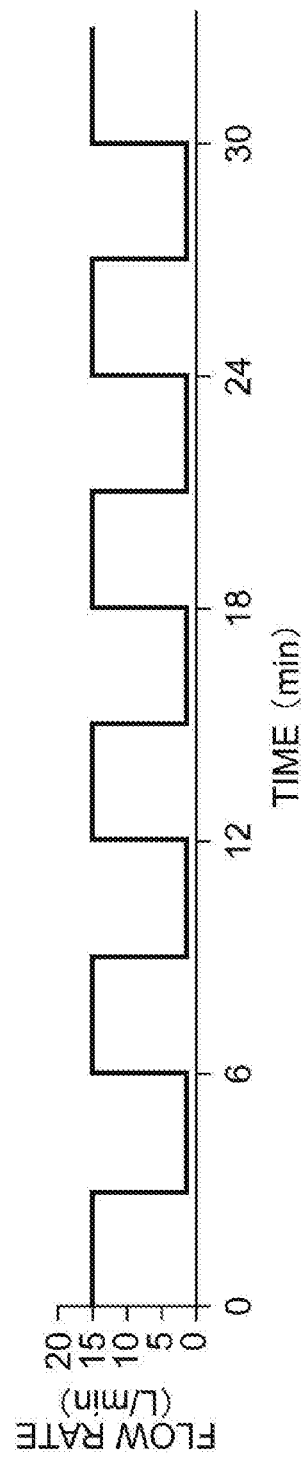
Fig. 11 (a)
Fig. 11 (b)

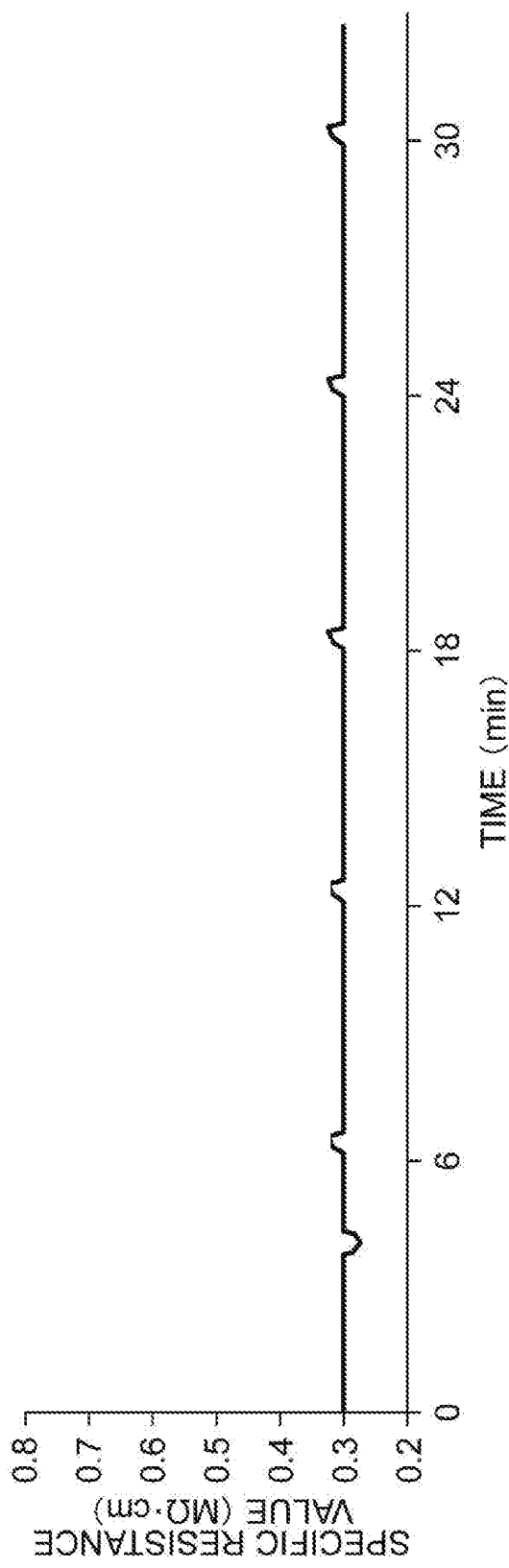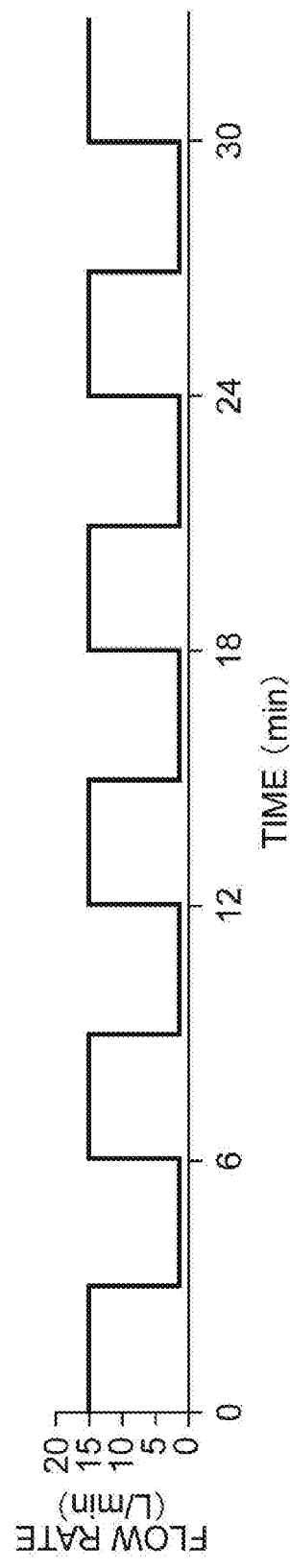
Fig. 12 (a)
Fig. 12 (b)

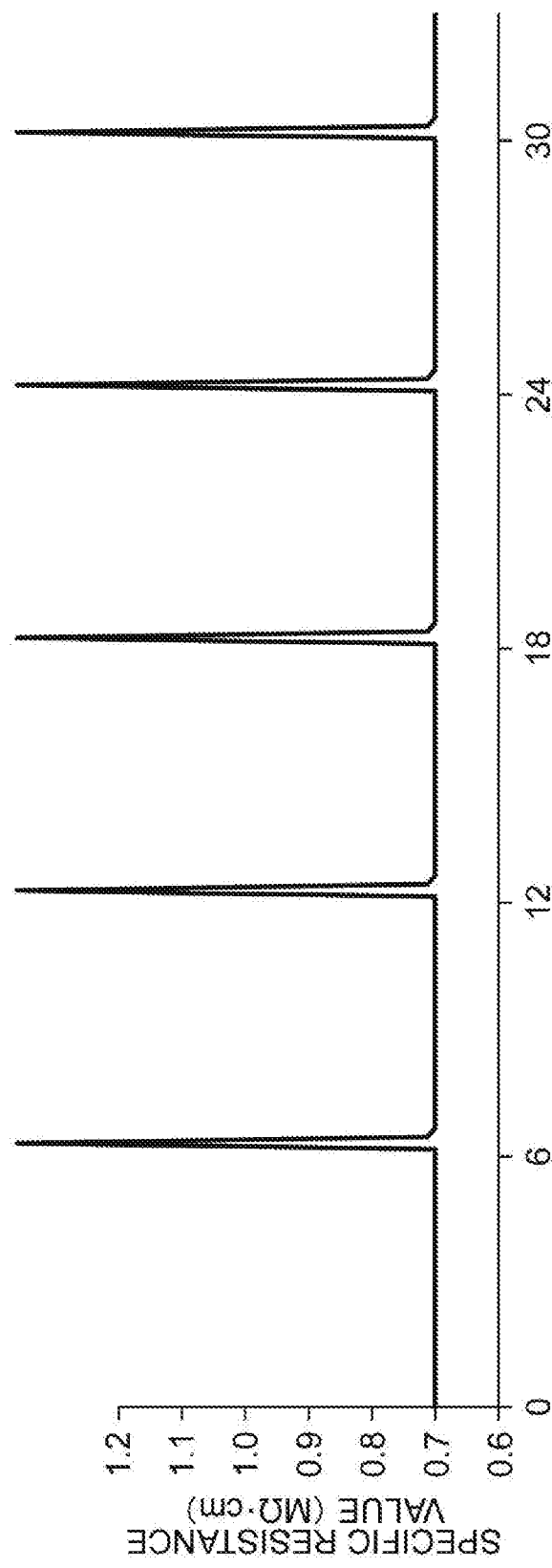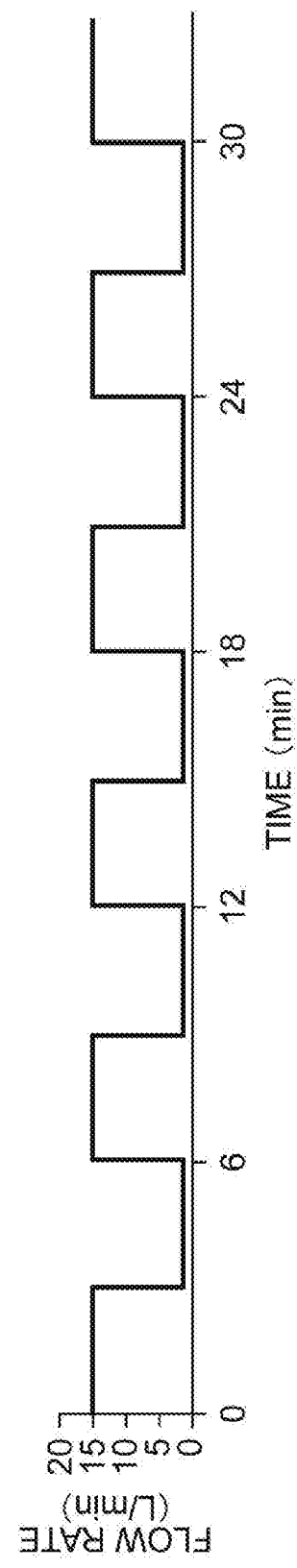
Fig. 13 (a)
Fig. 13 (b)

RESISTIVITY ADJUSTMENT DEVICE AND RESISTIVITY ADJUSTMENT METHOD

TECHNICAL FIELD

The invention relates to a specific resistance value adjustment apparatus and a specific resistance value adjustment method for adjusting a specific resistance value of a liquid.

BACKGROUND ART

In a semiconductor or liquid crystal manufacturing process, a substrate is cleaned by using ultrapure water. In this case, when a specific resistance value of ultrapure water is high, static electricity is generated. Accordingly, dielectric breakdown or reattachment of fine particles causes a remarkable adverse effect on product yield. In order to solve such a problem, a method using a hydrophobic hollow fiber membrane module has been proposed. In this method, a gas such as a carbonic acid gas or an ammonia gas is dissolved in ultrapure water by using a hollow fiber membrane module. Then, ions are generated by dissociation equilibrium and a specific resistance value of ultrapure water is lowered by the generated ions.

Further, in the process of cleaning and dicing the substrate, a flow variation of ultrapure water is severe. Therefore, Patent Literatures 1 and 2 propose a technique of stabilizing a specific resistance value even when a flow rate changes. In the technique described in Patent Literature 1, a hollow fiber membrane module which produces a small flow rate of gas addition ultrapure water and a bypassing pipe through which a large flow rate of ultrapure water passes are provided. Then, the produced gas addition ultrapure water and ultrapure water passing through the bypassing pipe are joined. Accordingly, the specific resistance value of ultrapure water can be easily adjusted. However, in the technique described in Patent Literature 1, there is a case in which the specific resistance value of ultrapure water increases since the flow rate of the ultrapure water supplied to the hollow fiber membrane module decreases with respect to the flow rate of the ultrapure water bypassing the hollow fiber membrane module when the flow rate of the ultrapure water is small. Therefore, in the technique described in Patent Literature 2, a plurality of bypassing pipes are provided and a shut valve is provided in one or a plurality of bypassing pipes. Then, when the flow rate of the ultrapure water decreases, the shut valve is partly or entirely opened. Accordingly, since it is possible to suppress a decrease in flow rate of ultrapure water supplied to the hollow fiber membrane module with respect to the flow rate of the ultrapure water bypassing the hollow fiber membrane module even when the flow rate of the ultrapure water is small, it is possible to suppress an increase in specific resistance value of ultrapure water.

CITATION LIST

Patent Literature

Patent Literature 1: Japanese Patent No. 3951385
Patent Literature 2: Japanese Unexamined Patent Publication No. 2012-223725

SUMMARY OF INVENTION

Technical Problem

However, since there is a need to provide a plurality of bypassing pipes in the technique described in Patent Literature 2, a problem arises in that a scale is large.

Therefore, an object of the invention is to provide a specific resistance value adjustment apparatus and a specific resistance value adjustment method capable of suppressing an increase in specific resistance value of a liquid even when a flow rate of a liquid is small while suppressing an increase in scale.

Solution to Problem

A specific resistance value adjustment apparatus according to an aspect of the invention is a specific resistance value adjustment apparatus including: a hollow fiber membrane module having a configuration in which a liquid phase side area to which a liquid is supplied and a gas phase side area to which an adjustment gas for adjusting a specific resistance value of the liquid is supplied is divided by a hollow fiber membrane and the adjustment gas permeating the hollow fiber membrane is dissolved in the liquid to produce an adjustment gas addition liquid in which the adjustment gas is dissolved in the liquid; a gas supply pipe which supplies the adjustment gas to the hollow fiber membrane module; a liquid supply pipe to which the liquid is supplied; a module passing pipe which communicates with the liquid supply pipe through a branch portion branching the liquid supply pipe and passes through the hollow fiber membrane module; a bypassing pipe which communicates with the liquid supply pipe through the branch portion and bypasses the hollow fiber membrane module; a liquid discharge pipe which communicates with the module passing pipe and the bypassing pipe through a joint portion in which the module passing pipe and the bypassing pipe are joined to each other at a downstream side of the hollow fiber membrane module; a first flow rate detection unit which detects a first flow rate of the liquid supplied to the liquid supply pipe; a control valve which opens and closes the module passing pipe; and a control unit which sets an opening degree of the control valve in response to the first flow rate detected by the first flow rate detection unit.

In the specific resistance value adjustment apparatus according to an aspect of the invention, the liquid supplied to the liquid supply pipe is distributed by the branch portion to the liquid supplied to the hollow fiber membrane module and the liquid bypassing the hollow fiber membrane module. In the hollow fiber membrane module, the adjustment gas permeating the hollow fiber membrane is dissolved in the liquid so as to produce the adjustment gas addition liquid in which the adjustment gas is dissolved in the liquid. The adjustment gas addition liquid produced by the hollow fiber membrane module and the liquid bypassing the hollow fiber membrane module are joined to each other at the joint portion to become the specific resistance value adjustment liquid and are discharged to the liquid discharge pipe.

Then, the opening degree of the control valve opening and closing the module passing pipe is set in response to the first flow rate of the liquid supplied to the liquid supply pipe. For this reason, it is possible to increase the flow rate of the liquid supplied to the hollow fiber membrane module by increasing the opening degree of the control valve when the flow rate of the liquid supplied to the liquid supply pipe is small. That is, it is possible to suppress a change of a distribution ratio of the flow rate of the liquid supplied to the hollow fiber membrane module and the flow rate of the liquid bypassing the hollow fiber membrane module even when the flow rate of the liquid is small. Accordingly, it is possible to suppress an increase in specific resistance value of the liquid even when the flow rate of the liquid is small while suppressing an increase in scale.

Further, since the opening degree of the control valve is set in response to the changed first flow rate when the first flow rate of the liquid supplied to the liquid supply pipe is changed, it is possible to suppress a change in specific resistance value of the liquid in accordance with a change of the first flow rate. Particularly, when the first flow rate of the liquid supplied to the liquid supply pipe is changed to a small flow rate, it is difficult to supply the liquid to the hollow fiber membrane module. However, also in this case, it is possible to suppress an increase in specific resistance value of the liquid in accordance with a change of the first flow rate.

As one embodiment, the module passing pipe may include a supply side module passing pipe which is disposed at an upstream side of the hollow fiber membrane module and supplies the liquid to the hollow fiber membrane module and a discharge side module passing pipe which is disposed at a downstream side of the hollow fiber membrane module and discharges the adjustment gas addition liquid from the hollow fiber membrane module and the control unit may be attached to the discharge side module passing pipe and open and close the discharge side module passing pipe. When the pressure loss of the control valve is large, there is a possibility that bubbling may occur since the liquid pressure of the liquid with respect to the gas pressure of the adjustment gas is too small in the hollow fiber membrane module when the control valve is attached to the supply side module passing pipe. Therefore, in the specific resistance value adjustment apparatus, it is possible to suppress the occurrence of bubbling in the hollow fiber membrane module even when the pressure loss of the control valve is large since the control valve is attached to the discharge side module passing pipe.

As one embodiment, the first flow rate detection unit may detect a flow rate of the liquid flowing through the liquid discharge pipe. Since the flow rate of the liquid supplied to the liquid supply pipe is the same as the flow rate of the specific resistance value adjustment liquid flowing through the liquid discharge pipe, the first flow rate detection unit may detect any one of the flow rate of the liquid flowing through the liquid supply pipe and the flow rate of the specific resistance value adjustment liquid flowing through the liquid discharge pipe as the first flow rate. However, the discharge side module passing pipe to which the control valve is attached is disposed at a position close to the liquid discharge pipe in relation to the liquid supply pipe. Therefore, in the specific resistance value adjustment apparatus, since the first flow rate detection unit detects the flow rate of the liquid flowing through the liquid discharge pipe as the first flow rate, it is possible to decrease the scale of the wiring connecting the first flow rate detection unit and the control valve to each other.

As one embodiment, the specific resistance value adjustment apparatus may further include a second flow rate detection unit which detects a second flow rate of the liquid flowing through the module passing pipe and the control unit may correct the opening degree in response to the second flow rate detected by the second flow rate detection unit. In the specific resistance value adjustment apparatus, since the second flow rate detection unit detects the second flow rate of the liquid flowing through the module passing pipe and the control unit corrects the opening degree in response to the second flow rate detected by the second flow rate detection unit, it is possible to further suppress a change of a distribution ratio of the flow rate of the liquid supplied to the hollow fiber membrane module and the flow rate of the liquid bypassing the hollow fiber membrane module even when the flow rate of the liquid is small.

As one embodiment, when the first flow rate is equal to or smaller than a set flow rate, the control unit may increase the opening degree as compared with a case in which the first flow rate is larger than the set flow rate. When the flow rate of the liquid supplied to the liquid supply pipe is small and the first flow rate is equal to or smaller than the set flow rate, it is difficult to supply the liquid to the hollow fiber membrane module as compared with a case in which the first flow rate is larger than the set flow rate. Therefore, in the specific resistance value adjustment apparatus, when the first flow rate is equal to or smaller than the set flow rate, the opening degree of the control valve is increased and the flow rate of the liquid supplied to the hollow fiber membrane module is increased as compared with a case in which the first flow rate is larger than the set flow rate. Accordingly, even when the first flow rate is equal to or smaller than the set flow rate, it is possible to prevent a change of a distribution ratio of the flow rate of the liquid supplied to the hollow fiber membrane module and the flow rate of the liquid bypassing the hollow fiber membrane module.

As one embodiment, when the first flow rate is equal to or smaller than the set flow rate, the control unit may increase the opening degree as the first flow rate decreases. When the flow rate of the liquid supplied to the liquid supply pipe is small and the first flow rate is equal to or smaller than the set flow rate, it is difficult to supply the liquid to the hollow fiber membrane module as the first flow rate decreases. Therefore, in the specific resistance value adjustment apparatus, when the first flow rate is equal to or smaller than the set flow rate, the opening degree of the control valve is increased and the flow rate of the liquid supplied to the hollow fiber membrane module is increased as the first flow rate decreases. Accordingly, even when the first flow rate is equal to or smaller than the set flow rate, it is possible to further suppress a change of a distribution ratio of the flow rate of the liquid supplied to the hollow fiber membrane module and the flow rate of the liquid bypassing the hollow fiber membrane module.

As one embodiment, when the first flow rate is larger than the set flow rate, the control unit may increase the opening degree as the first flow rate decreases. Even when the first flow rate is larger than the set flow rate, there is a tendency that the liquid is not easily supplied to the hollow fiber membrane module as the first flow rate decreases. Therefore, in the specific resistance value adjustment apparatus, when the first flow rate is larger than the set flow rate, the opening degree of the control valve is increased and the flow rate of the liquid supplied to the hollow fiber membrane module is increased as the first flow rate decreases. Accordingly, even when the first flow rate is larger than the set flow rate, it is possible to prevent a change of a distribution ratio of the flow rate of the liquid supplied to the hollow fiber membrane module and the flow rate of the liquid bypassing the hollow fiber membrane module.

As one embodiment, when the first flow rate is equal to or smaller than the set flow rate, the control unit may increase a ratio of a change rate of the opening degree with respect to a change rate of the first flow rate as compared with a case in which the first flow rate is larger than the set flow rate. A tendency that the liquid is not easily supplied to the hollow fiber membrane module as the first flow rate decreases is larger as the first flow rate is equal to or smaller than the set flow rate. Therefore, in the specific resistance value adjustment apparatus, when the first flow rate is equal to or smaller than the set flow rate, a ratio of the change rate of the opening degree of the control valve with respect to the change rate of the first flow rate is increased as compared with a case in which the first flow rate is larger than the set flow rate. Accordingly, it is possible to further suppress a change of a distribution ratio of the flow rate of the liquid supplied to the hollow fiber membrane module and the flow rate of the liquid bypassing the hollow fiber membrane module.

As one embodiment, the adjustment gas addition liquid may be an adjustment gas saturation liquid in which the adjustment gas is dissolved in the liquid in a saturated state. In the specific resistance value adjustment apparatus, the adjustment gas saturation liquid in which the adjustment gas is dissolved in the liquid in a saturated state is produced as the adjustment gas addition liquid by the hollow fiber membrane module. Accordingly, it is possible to highly accurately adjust the specific resistance value of the liquid just by adjusting a distribution ratio of the flow rate of the liquid supplied to the hollow fiber membrane module and the flow rate of the liquid bypassing the hollow fiber membrane module.

A specific resistance value adjustment method according to an aspect of the invention is a specific resistance value adjustment method of adjusting a specific resistance value of a liquid by using a hollow fiber membrane module having a configuration in which a liquid phase side area to which a liquid is supplied and a gas phase side area to which an adjustment gas for adjusting a specific resistance value of the liquid is supplied is divided by a hollow fiber membrane and the adjustment gas permeating the hollow fiber membrane is dissolved in the liquid to produce an adjustment gas addition liquid in which the adjustment gas is dissolved in the liquid, including: supplying the liquid to a liquid supply pipe; distributing the liquid supplied to the liquid supply pipe to a module passing pipe passing through the hollow fiber membrane module and a bypassing pipe bypassing the hollow fiber membrane module; producing the adjustment gas addition liquid in which the adjustment gas is dissolved in the liquid in a saturated state in the hollow fiber membrane module by supplying the adjustment gas to the hollow fiber membrane module; joining the adjustment gas addition liquid produced by the hollow fiber membrane module to the liquid bypassing the hollow fiber membrane module and discharging a resultant liquid to a liquid discharge pipe; and setting an opening degree of a control valve opening and closing the module passing pipe in response to a first flow rate of the liquid supplied to the liquid supply pipe.

In the specific resistance value adjustment method according to an aspect of the invention, since the adjustment gas addition liquid in which the adjustment gas is dissolved in the liquid in a saturated state is produced and the adjustment gas addition liquid produced by the hollow fiber membrane module is joined to the liquid bypassing the hollow fiber membrane module, it is possible to easily adjust the specific resistance value of the liquid.

Then, since the opening degree of the control valve is set in response to the first flow rate of the liquid supplied to the liquid supply pipe, it is possible to increase the opening degree of the control valve and to increase the flow rate of the liquid supplied to the hollow fiber membrane module when the flow rate of the liquid supplied to the liquid supply pipe is small. That is, even when the flow rate of the liquid supplied to the liquid supply pipe is small, it is possible to prevent a change of a distribution ratio of the flow rate of the liquid supplied to the hollow fiber membrane module and the flow rate of the liquid bypassing the hollow fiber membrane module. Accordingly, it is possible to suppress an increase in specific resistance value of the liquid even when the flow rate of the liquid supplied to the liquid supply pipe is small while suppressing an increase in scale.

Further, since the opening degree of the control valve is set in response to the changed first flow rate when the first flow rate of the liquid supplied to the liquid supply pipe is changed, it is possible to suppress a change in specific resistance value of the liquid in accordance with a change of the first flow rate. Particularly, when the first flow rate of the liquid supplied to the liquid supply pipe is changed to a small flow rate, it is difficult to supply the liquid to the hollow fiber membrane module. However, also in this case, it is possible to suppress an increase in specific resistance value of the liquid in accordance with a change of the first flow rate.

As one embodiment, when the first flow rate is equal to or smaller than the set flow rate, the opening degree may be increased as compared with a case in which the first flow rate is larger than the set flow rate. When the flow rate of the liquid supplied to the liquid supply pipe is small and the first flow rate is equal to or smaller than the set flow rate, it is difficult to supply the liquid to the hollow fiber membrane module as compared with a case in which the first flow rate is larger than the set flow rate. Therefore, in the specific resistance value adjustment method, when the first flow rate is equal to or smaller than the set flow rate, the opening degree of the control valve is increased and the flow rate of the liquid supplied to the hollow fiber membrane module is increased as compared with a case in which the first flow rate is larger than the set flow rate. Accordingly, even when the first flow rate is equal to or smaller than the set flow rate, it is possible to prevent a change of a distribution ratio of the flow rate of the liquid supplied to the hollow fiber membrane module and the flow rate of the liquid bypassing the hollow fiber membrane module.

Advantageous Effects of Invention

According to the invention, it is possible to suppress an increase in specific resistance value of a liquid even when a flow rate of the liquid is small while suppressing an increase in scale.

BRIEF DESCRIPTION OF DRAWINGS

FIG. 8(a) and FIG. 8(b) are diagrams showing a measurement result of Example 4, where FIG. 8(a) is a diagram showing a relationship between an elapse time and a specific resistance value and FIG. 8(b) is a diagram showing a relationship between an elapse time and a flow rate.

FIG. 9(a) and FIG. 9(b) are diagrams showing a measurement result of Comparative Example 4, where FIG. 9(a) is a diagram showing a relationship between an elapse time and a specific resistance value and FIG. 9(b) is a diagram showing a relationship between an elapse time and a flow rate.

FIG. 10(a) and FIG. 10(b) are diagrams showing a measurement result of Example 5, where FIG. 10(a) is a diagram showing a relationship between an elapse time and a specific resistance value and FIG. 10(b) is a diagram showing a relationship between an elapse time and a flow rate.

FIG. 11(a) and FIG. 11(b) are diagrams showing a measurement result of Comparative Example 5, where FIG. 11(a) is a diagram showing a relationship between an elapse time and a specific resistance value and FIG. 11(b) is a diagram showing a relationship between an elapse time and a flow rate.

FIG. 12(a) and FIG. 12(b) are diagrams showing a measurement result of Example 6, where FIG. 12(a) is a diagram showing a relationship between an elapse time and a specific resistance value and FIG. 12(b) is a diagram showing a relationship between an elapse time and a flow rate.

FIG. 13(a) and FIG. 13(b) are diagrams showing a measurement result of Comparative Example 6, where FIG. 13(a) is a diagram showing a relationship between an elapse time and a specific resistance value and FIG. 13(b) is a diagram showing a relationship between an elapse time and a flow rate.

DESCRIPTION OF EMBODIMENTS

Figure 1:
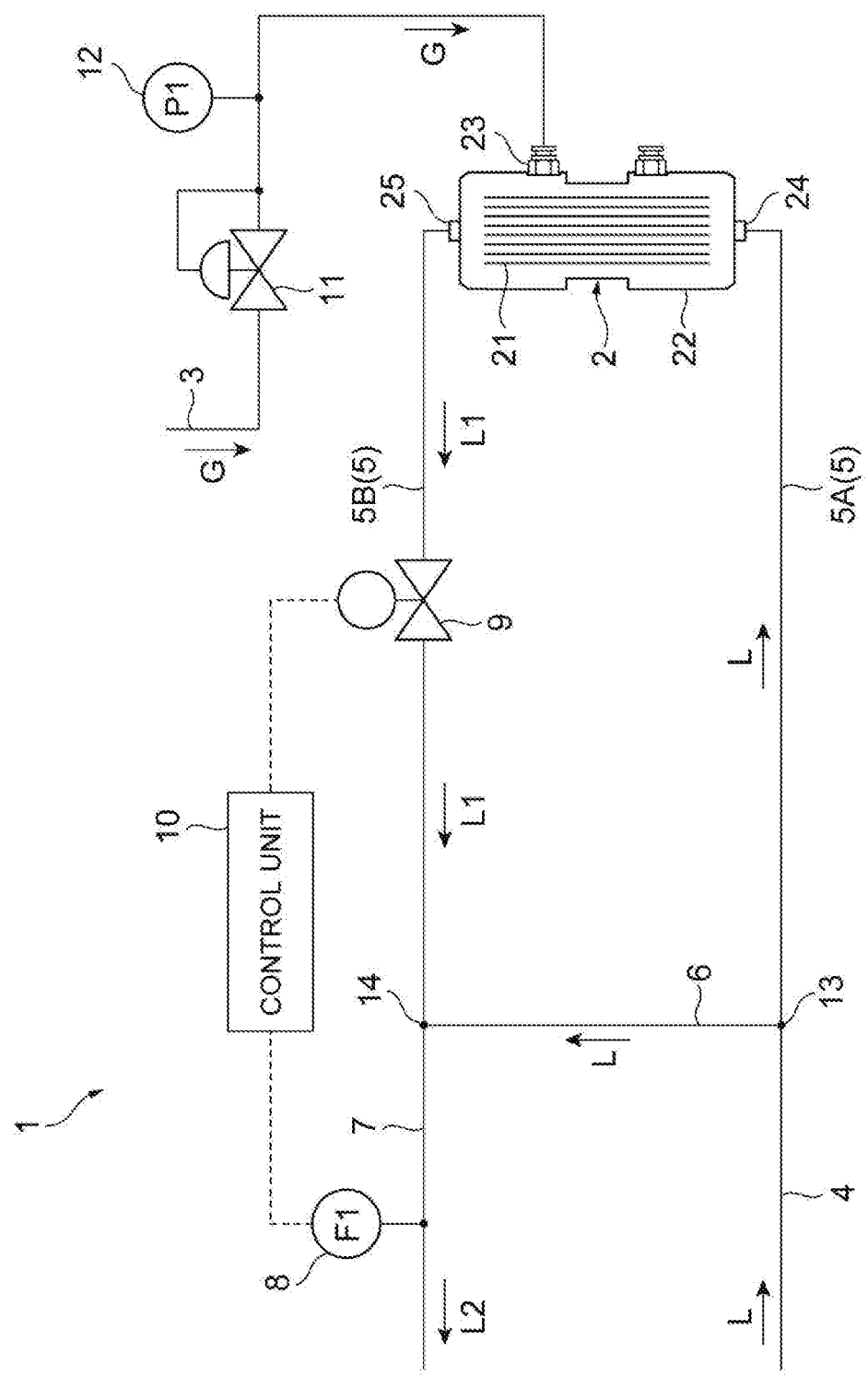
FIG. 1 is a schematic diagram of a specific resistance value adjustment apparatus of a first embodiment.

Hereinafter, a specific resistance value adjustment apparatus and a specific resistance value adjustment method of an embodiment will be described with reference to the drawings. Furthermore, in all drawings, the same reference numerals will be given to the same or equivalent parts and a repetitive description thereof will be omitted.

First Embodiment

FIG. 1 is a schematic diagram of a specific resistance value adjustment apparatus of a first embodiment. As illustrated in FIG. 1, a specific resistance value adjustment apparatus 1 of the embodiment includes a hollow fiber membrane module 2, a gas supply pipe 3, a liquid supply pipe 4, a module passing pipe 5, a bypassing pipe 6, a liquid discharge pipe 7, a first flow rate detection unit 8, a control valve 9, and a control unit 10.

The hollow fiber membrane module 2 dissolves an adjustment gas G for adjusting a specific resistance value of a liquid L in the liquid L to be subjected to the adjustment of the specific resistance value. The liquid used as the liquid L is not particularly limited, but, for example, ultrapure water for cleaning a semiconductor, a liquid crystal, and the like can be used. In general, the specific resistance value of ultrapure water is in the range equal to or larger than 17.5 [MΩ·cm] and equal to or smaller than 18.2 [MΩ·cm]. A gas used as the adjustment gas G is not particularly limited, but, for example, a carbonic acid gas or an ammonia gas can be used. The hollow fiber membrane module 2 includes a plurality of hollow fiber membranes 21 and a housing 22 which accommodates these hollow fiber membranes 21.

The hollow fiber membrane 21 is a hollow fiber-shaped membrane which permeates a gas but does not transmit a liquid. The material, film shape, film form, and the like of the hollow fiber membrane 21 are not particularly limited. The housing 22 is a hermetic container which accommodates the hollow fiber membrane 21.

An area inside the housing 22 of the hollow fiber membrane module 2 is divided into a liquid phase side area and a gas phase side area by the hollow fiber membrane 21. The liquid phase side area is an area to which the liquid L is supplied in the area inside the housing 22 of the hollow fiber membrane module 2. The gas phase side area is an area to which the adjustment gas G is supplied in the area inside the housing 22 of the hollow fiber membrane module 2. As the type of the hollow fiber membrane module 2, an internal perfusion type and an external perfusion type exist. In the embodiment, any one of the internal perfusion type and the external perfusion type may be used. In the external perfusion type hollow fiber membrane module 2, the inside (the inner surface side) of the hollow fiber membrane 21 becomes the gas phase side area and the outside (the outer surface side) of the hollow fiber membrane 21 becomes the liquid phase side area. In the internal perfusion type hollow fiber membrane module 2, the inside (the inner surface side) of the hollow fiber membrane 21 becomes the liquid phase side area and the outside (the outer surface side) of the hollow fiber membrane 21 becomes the gas phase side area. Then, the hollow fiber membrane module 2 dissolves the adjustment gas G permeating the hollow fiber membrane 21 in the liquid L to produce an adjustment gas addition liquid L1 in which the adjustment gas G is dissolved in the liquid L. At this time, it is desirable to produce an adjustment gas saturation liquid in which the adjustment gas G is dissolved in a saturated state in the liquid L as the adjustment gas addition liquid L1 by, for example, uniformly setting a gas pressure of the adjustment gas G supplied to the hollow fiber membrane module 2 and adjusting the flow rate of the liquid L supplied to the hollow fiber membrane module 2. Furthermore, the flow rate of the liquid L supplied to the hollow fiber membrane module 2 can be adjusted by the control valve 9.

The housing 22 is provided with a gas supply port 23, a liquid supply port 24, and a liquid discharge port 25. The gas supply port 23 is an opening which is formed in the housing 22 to supply the adjustment gas G to the gas phase side area. The liquid supply port 24 is an opening which is formed in the housing 22 to supply the liquid L to the liquid phase side area. The liquid discharge port 25 is an opening which is formed in the housing 22 to discharge the adjustment gas addition liquid L1 from the liquid phase side area. For this reason, the gas supply port 23 communicates with the gas phase side area and the liquid supply port 24 and the liquid discharge port 25 communicate with the liquid phase side area. The positions of the gas supply port 23, the liquid supply port 24, and the liquid discharge port 25 are not particularly limited.

The gas supply pipe 3 is a tubular member having a flow passage formed at the inner peripheral side. The gas supply pipe 3 is connected to the gas supply port 23. The gas supply pipe 3 communicates with the gas phase side area of the hollow fiber membrane module 2 and supplies the adjustment gas G to the gas phase side area of the hollow fiber membrane module 2. The material, characteristics (hardness, elasticity, and the like), shape, size, and the like of the gas supply pipe 3 are not particularly limited.

A pressure adjustment valve 11 and a pressure gauge 12 are connected to the gas supply pipe 3. The pressure adjustment valve 11 adjusts the gas pressure of the adjustment gas G flowing through the gas supply pipe 3. That is, the gas pressure of the adjustment gas G in the gas phase side area is adjusted by the pressure adjustment valve 11. As the pressure adjustment valve 11, various known pressure adjustment valves can be employed. The pressure gauge 12 measures the gas pressure of the adjustment gas G flowing through the gas supply pipe 3. The pressure gauge 12 is connected to the downstream side of the pressure gauge 12 in the gas supply pipe 3, that is, the gas phase side area of the pressure gauge 12 in the gas supply pipe 3. As the pressure gauge 12, various known pressure gauges can be employed and, for example, a diaphragm valve can be used. Then, a control unit (not illustrated) which controls the specific resistance value adjustment apparatus 1 controls the pressure adjustment valve 11 on the basis of the gas pressure of the adjustment gas G measured by the pressure gauge 12 so that the gas pressure of the adjustment gas G flowing through the gas supply pipe 3, that is, the gas pressure of the adjustment gas G in the gas phase side area falls within a predetermined value (or a predetermined range).

Furthermore, in the embodiment, an example in which the adjustment gas G is not discharged from the gas phase side area of the hollow fiber membrane module 2 has been described, but the adjustment gas G may be discharged from the gas phase side area of the hollow fiber membrane module 2. In this case, the housing 22 of the hollow fiber membrane module 2 is provided with a gas discharge port (not illustrated) which is an opening for discharging the adjustment gas G from the gas phase side area. Then, a gas discharge pipe (not illustrated) to which the adjustment gas G is discharged from the gas phase side area of the hollow fiber membrane module 2 is connected to the gas discharge port. The gas discharge pipe is a tubular member having a flow passage formed at the inner peripheral side.

The liquid supply pipe 4 is a tubular member having a flow passage formed at the inner peripheral side. All of the liquid L supplied to the specific resistance value adjustment apparatus 1 is supplied to the liquid supply pipe 4. The liquid supply pipe 4 is branched to the module passing pipe 5 and the bypassing pipe 6 by a branch portion 13. That is, the liquid supply pipe 4 is connected to the upstream side of the branch portion 13 and the module passing pipe 5 and the bypassing pipe 6 are connected to the downstream side of the branch portion 13. Then, the branch portion 13 branches and discharges the liquid L flowing through the liquid supply pipe 4 to the module passing pipe 5 and the bypassing pipe 6.

The module passing pipe 5 is a tubular member having a flow passage formed at the inner peripheral side. The module passing pipe 5 communicates with the liquid supply pipe 4 through the branch portion 13. The module passing pipe 5 passes through the hollow fiber membrane module 2. That is, the hollow fiber membrane module 2 is connected to the middle of the module passing pipe 5. For this reason, the module passing pipe 5 includes a supply side module passing pipe 5A which supplies the liquid L to the hollow fiber membrane module 2 and a discharge side module passing pipe 5B which discharges the adjustment gas addition liquid L1 from the hollow fiber membrane module 2.

The supply side module passing pipe 5A is disposed at the upstream side of the hollow fiber membrane module 2 and is connected to the liquid supply port 24 of the hollow fiber membrane module 2. The supply side module passing pipe 5A communicates with the liquid phase side area of the hollow fiber membrane module 2 and supplies the liquid L to the liquid phase side area of the hollow fiber membrane module 2. The material, characteristics (hardness, elasticity, and the like), shape, size, and the like of the supply side module passing pipe 5A are not particularly limited.

The discharge side module passing pipe 5B is disposed at the downstream side of the hollow fiber membrane module 2 and is connected to the liquid discharge port 25 of the hollow fiber membrane module 2. The discharge side module passing pipe 5B communicates with the liquid phase side area of the hollow fiber membrane module 2 and discharges the adjustment gas addition liquid L1 from the liquid phase side area of the hollow fiber membrane module 2. The material, characteristics (hardness, elasticity, and the like), shape, size, and the like of the discharge side module passing pipe 5B are not particularly limited.

The bypassing pipe 6 is a tubular member having a flow passage formed at the inner peripheral side. The bypassing pipe 6 communicates with the liquid supply pipe 4 through the branch portion 13. The bypassing pipe 6 bypasses the hollow fiber membrane module 2. For this reason, the liquid L flowing through the bypassing pipe 6 is not supplied to the hollow fiber membrane module 2 and bypasses the hollow fiber membrane module 2. The bypassing pipe 6 is joined to the discharge side module passing pipe 5B of the module passing pipe 5 by a joint portion 14.

The discharge side module passing pipe 5B and the bypassing pipe 6 are connected to the upstream side of the joint portion 14 and the liquid discharge pipe 7 is connected to the downstream side of the joint portion 14. Then, the joint portion 14 joins the adjustment gas addition liquid L1 flowing through the discharge side module passing pipe 5B to the liquid L flowing through the bypassing pipe 6 at the downstream side of the hollow fiber membrane module 2. Then, the joint portion 14 discharges a specific resistance value adjustment liquid L2 obtained by joining the liquid L to the adjustment gas addition liquid L1 to the liquid discharge pipe 7.

The liquid discharge pipe 7 is a tubular member having a flow passage formed at the inner peripheral side. The liquid discharge pipe 7 is connected to the joint portion 14 and the liquid discharge pipe 7 communicates with the discharge side module passing pipe 5B and the bypassing pipe 6 through the joint portion 14 and discharges the specific resistance value adjustment liquid L2 from the joint portion 14. The material, characteristics (hardness, elasticity, and the like), shape, size, and the like of the liquid discharge pipe 7 are not particularly limited.

The first flow rate detection unit 8 detects the flow rate of the liquid L supplied to the liquid supply pipe 4 as a first flow rate. Here, the liquid L supplied to the liquid supply pipe 4 is branched to the supply side module passing pipe 5A and the bypassing pipe 6 at the branch portion 13 and is further joined at the joint portion 14. For this reason, the flow rate of the specific resistance value adjustment liquid L2 flowing through the liquid discharge pipe 7 becomes the same as that of the liquid L supplied to the liquid supply pipe 4. Therefore, in the embodiment, the first flow rate detection unit 8 is connected to the liquid discharge pipe 7 and the flow rate of the specific resistance value adjustment liquid L2 flowing through the liquid discharge pipe 7 is detected as the first flow rate. Then, the first flow rate detection unit 8 transmits the first flow rate information to the control unit 10. As the first flow rate detection unit 8, various known flowmeters can be employed.

The control valve 9 is a valve which opens and closes a flow passage of the module passing pipe 5. The control valve 9 is controlled by the control unit 10 to be opened and closed and to open the flow passage of the module passing pipe 5 at an opening degree set by the control unit 10. As the control valve 9, various known electromagnetic valves such as a proportional control valve can be employed.

The control unit 10 is electrically connected to the control valve 9. Then, the control unit 10 sets an opening degree for opening the module passing pipe 5 and opens and closes the control valve 9 so that the opening degree of the control valve 9 becomes a set opening degree. For this reason, when the control unit 10 sets the opening degree of the control valve 9, it is possible to adjust the flow rate of the liquid L flowing through the module passing pipe 5, that is, the flow rate of the liquid L supplied to the hollow fiber membrane module 2.

The control unit 10 sets the opening degree of the control valve 9 so that the adjustment gas addition liquid L1 (the adjustment gas saturation liquid) produced by the hollow fiber membrane module 2 is joined to the liquid L having passed through the bypassing pipe 6 to become the specific resistance value adjustment liquid L2. Here, the saturated state includes not only a completely saturated state, but a substantially saturated state. The substantially saturated state means a state in which the adjustment gas G is dissolved in the liquid L to a degree that the specific resistance value of the liquid L can be adjusted only according to the distribution ratio between the flow rate of the liquid L supplied to the hollow fiber membrane module 2 and the flow rate of the liquid L bypassing the hollow fiber membrane module 2.

Further, the control unit 10 is also electrically connected to the first flow rate detection unit 8. Then, the control unit 10 sets the opening degree of the control valve 9 in response to the information of the first flow rate transmitted from the first flow rate detection unit 8 (the first flow rate detected by the first flow rate detection unit 8).

Specifically, when the first flow rate is equal to or smaller than the set flow rate, the control unit 10 sets the opening degree of the control valve 9 to be larger than a case in which the first flow rate is larger than the set flow rate. As the set flow rate, an arbitrary flow rate can be used. For example, if the distribution ratio between the flow rate of the liquid L supplied to the hollow fiber membrane module 2 and the flow rate of the liquid L bypassing the hollow fiber membrane module 2 is changed when the opening degree of the control valve 9 if fixed, it is possible to set a flow rate at which the specific resistance value of the liquid L starts to largely increase.

In this case, when the first flow rate is equal to or smaller than the set flow rate, the control unit 10 may uniformly set the opening degree of the control valve 9. However, it is desirable to increase the opening degree of the control valve 9 as the first flow rate decreases. Further, when the first flow rate is larger than the set flow rate, the control unit 10 may uniformly set the opening degree of the control valve 9. However, it is desirable to increase the opening degree of the control valve 9 as the first flow rate decreases. Furthermore, there is a case in which the opening degree of the control valve 9 is increased as the first flow rate decreases in both cases in which the first flow rate is equal to or smaller than the set flow rate and the first flow rate is larger than the set flow rate. In this case, when the first flow rate is equal to or smaller than the set flow rate, the control unit 10 sets the change rate of the opening degree of the control valve 9 with respect to the change rate of the first flow rate to be larger than a case in which the first flow rate is larger than the set flow rate.

In a case in which the control unit 10 sets the opening degree of the control valve 9, it is desirable to prepare a table showing a relationship between the first flow rate and the opening degree of the control valve 9 and to obtain the opening degree of the control valve 9 from the first flow rate detected by the first flow rate detection unit 8 on the basis of the table. However, the control unit 10 may obtain the opening degree of the control valve 9 by a calculation instead of obtaining the opening degree of the control valve 9 from such a table.

Figure 2:
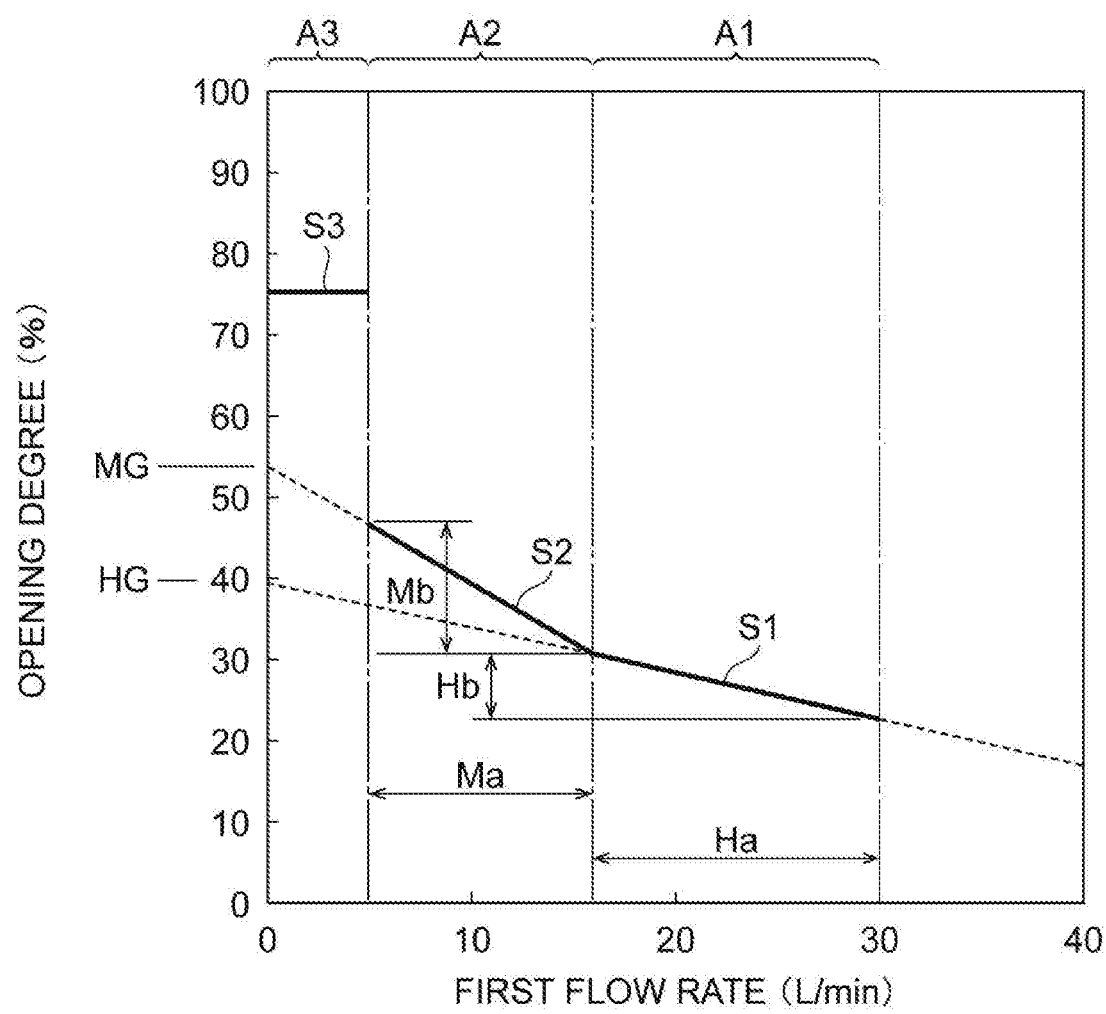
FIG. 2 is a diagram showing an example of a table showing a relationship between a first flow rate and an opening degree of a control valve.

Here, an example of a table showing a relationship between the first flow rate and the opening degree of the control valve 9 is shown in FIG. 2. In the table shown in FIG. 2, the flow rate range of the first flow rate is divided into three ranges including a first flow rate range A1, a second flow rate range A2, and a third flow rate range A3. The first flow rate range A1 is a flow rate range which is larger than the set flow rate. The second flow rate range A2 is a flow rate range which is equal to or larger than the minimum flow rate that can be detected (guaranteed) by the first flow rate detection unit 8 and which is equal to or smaller than the set flow rate. The third flow rate range A3 is a flow rate range which is smaller than the minimum flow rate that can be detected by the first flow rate detection unit 8.

In the first flow rate range A1, a relationship between the first flow rate and the opening degree of the control valve 9 is indicated by a line S1. In the second flow rate range A2, a relationship between the first flow rate and the opening degree of the control valve 9 is indicated by a line S2. In the third flow rate range A3, a relationship between the first flow rate and the opening degree of the control valve 9 is indicated by a line S3.

The line S1 is a line which is expressed by the following equation (1).

$$V = -HB \cdot x + HG \quad (1)$$

In the equation (1), x indicates the first flow rate [L/min], V indicates, the opening degree [%] of the control valve 9, HB (hereinafter, referred to as a "bias HB") indicates a ratio of the change rate of the opening degree of the control valve 9 with respect to the change rate of the first flow rate, and HG (hereinafter, referred to as a "gain HG") indicates the opening degree of the control valve 9 when the first flow rate is set to 0 [L/min]. The bias HB is expressed by, for example, a ratio (Hb/Ha) of the change rate Hb of the opening degree of the control valve 9 in the entire range of the first flow rate range A1 with respect to the change rate Ha of the first flow rate in the entire range of the first flow rate range A1.

The bias FIB and the gain HG are set as below. First, in order to easily produce the adjustment gas saturation liquid, the bias HB is set so that the opening degree of the control valve 9 increases as the first flow rate decreases. As described above, in the hollow fiber membrane module 2, it is desirable to produce the adjustment gas saturation liquid in which the adjustment gas G is dissolved in the liquid L in a saturated state as the adjustment gas addition liquid L1. Meanwhile, since the gas pressure of the adjustment gas G is uniformly kept in the hollow fiber membrane module 2, the dissolving ratio of the adjustment gas G with respect to the liquid L changes in response to the flow rate of the liquid L supplied to the hollow fiber membrane module 2. Therefore, the bias HB and the gain HG are set so that the adjustment gas saturation liquid is produced by the hollow fiber membrane module 2 in the entire range or the substantially entire range of the first flow rate range A1. In this case, the opening degree of the control valve 9 at the time of producing the adjustment gas saturation liquid in the hollow fiber membrane module 2 is measured by a previous experiment while changing the first flow rate of the first flow rate range A1. Then, it is desirable to set the bias HB and the gain HG on the basis of the measurement result.

The line S2 is a line which is expressed by the following equation (2).

$$V = -MB \cdot x + MG \quad (2)$$

In the equation (2), x indicates the first flow rate [L/min], V indicates the opening degree [%] of the control valve 9, MB indicates a ratio (hereinafter, referred to as a "bias MB") of the change rate of the opening degree of the control valve 9 with respect to the change rate of the first flow rate, and MG (hereinafter, referred to as a "gain MG") indicates the opening degree of the control valve 9 when the first flow rate is set to 0 [L/min]. The bias MB is expressed by, for example, a ratio (Mb/Ma) of the change rate Mb of the opening degree of the control valve 9 in the entire range of the second flow rate range A2 with respect to the change rate of the first flow rate Ma in the entire range of the second flow rate range A2.

The bias HB and the gain HG are set as below. First, when the first flow rate abruptly changes at the boundary between the first flow rate range A1 and the second flow rate range A2, there is a possibility that the specific resistance value of the liquid L largely changes when the first flow rate is changed. Therefore, the bias MB and the gain MG are set so that the line S1 is continuous to the line S2. Further, the bias MB and the gain MG are set so that the first flow rate of the second flow rate range A2 is larger than that of the first flow rate range A1, the opening degree of the control valve 9 increases as the first flow rate decreases, and the bias MB (a ratio of the change rate Mb of the opening degree of the control valve 9 with respect to the change rate of the first flow rate Ma of the second flow rate range A2) is larger than the bias HB (a ratio of the change rate Hb of the opening degree of the control valve 9 with respect to the change rate of the first flow rate Ha). Furthermore, in order to produce the adjustment gas saturation liquid also in the second flow rate range A2, the opening degree of the control valve 9 at the time of producing the adjustment gas saturation liquid in the hollow fiber membrane module 2 is measured by a previous experiment while changing the first flow rate of the second flow rate range A2. Then, it is desirable to set the bias MB and the gain MG on the basis of the measurement result.

The line S3 is a line which is expressed by the following equation (3).

$$V = LG \quad (3)$$

In the equation (3), V indicates the opening degree [%] of the control valve 9 and LG indicates a value which is larger than the maximum opening degree of the control valve 9 in the second flow rate range A2. That is, in the third flow rate range A3, the first flow rate cannot be accurately detected by the first flow rate detection unit 8. Therefore, in the third flow rate range A3, from the viewpoint of preventing an error, the opening degree of the control valve 9 is fixed to an opening degree which is larger than the maximum opening degree of the control valve 9 in the second flow rate range A2.

In this way, in the embodiment, the liquid L supplied to the liquid supply pipe 4 is distributed by the branch portion 13 to the liquid L supplied to the hollow fiber membrane module 2 and the liquid L bypassing the hollow fiber membrane module 2. In the hollow fiber membrane module 2, the adjustment gas G permeating the hollow fiber membrane 21 is dissolved in the liquid L so as to produce the adjustment gas addition liquid L1 in which the adjustment gas G is dissolved in the liquid L. The adjustment gas addition liquid produced by the hollow fiber membrane module 2 and the liquid L bypassing the hollow fiber membrane module 2 are joined to each other at the joint portion 14 to become the specific resistance value adjustment liquid L2 and are discharged to the liquid discharge pipe 7.

Then, the opening degree of the control valve 9 opening and closing the module passing pipe 5 is set in response to the first flow rate of the liquid L supplied to the liquid supply pipe 4. For this reason, it is possible to increase the flow rate of the liquid L supplied to the hollow fiber membrane module 2 by increasing the opening degree of the control valve 9 when the flow rate of the liquid L supplied to the liquid supply pipe 4 is small. That is, it is possible to suppress a change of the distribution ratio of the flow rate of the liquid L supplied to the hollow fiber membrane module 2 and the flow rate of the liquid L bypassing the hollow fiber membrane module 2 even when the flow rate of the liquid L is small. Accordingly, it is possible to suppress an increase in specific resistance value of the liquid L even when the flow rate of the liquid L is small while suppressing an increase in scale.

Further, it is possible to suppress a change of the specific resistance value of the liquid L in accordance with a change of the first flow rate since the opening degree of the control valve 9 is set in response to the changed first flow rate when the first flow rate of the liquid L supplied to the liquid supply pipe 4 is changed. In particular, when the first flow rate of the liquid L supplied to the liquid supply pipe 4 is changed to a small flow rate, it is difficult to supply the liquid L to the hollow fiber membrane module 2. However, also in this case, it is possible to suppress an increase in specific resistance value of the liquid L in accordance with a change of the first flow rate.

Incidentally, when the pressure loss of the control valve 9 is large, there is a possibility that bubbling may occur since the liquid pressure of the liquid L with respect to the gas pressure of the adjustment gas G is too small in the hollow fiber membrane module 2 when the control valve 9 is attached to the supply side module passing pipe 5A. Therefore, since the control valve 9 is attached to the discharge side module passing pipe 5B, it is possible to suppress the bubbling of the hollow fiber membrane module 2 even when the pressure loss of the control valve 9 is large.

Further, since the flow rate of the liquid L supplied to the liquid supply pipe 4 is the same as the flow rate of the specific resistance value adjustment liquid L2 flowing through the liquid discharge pipe 7, the first flow rate detection unit 8 may detect any one of the flow rate of the liquid L flowing through the liquid supply pipe 4 and the flow rate of the specific resistance value adjustment liquid L2 flowing through the liquid discharge pipe 7 as the first flow rate. However, the discharge side module passing pipe 5B to which the control valve 9 is attached is disposed at a position close to the liquid discharge pipe 7 in relation to the liquid supply pipe 4. Therefore, since the first flow rate detection unit 8 detects the flow rate of the specific resistance value adjustment liquid L2 flowing through the liquid discharge pipe 7 as the first flow rate, it is possible to decrease the scale of the wiring connecting the first flow rate detection unit 8 and the control valve 9 to each other.

Further, when the flow rate of the liquid L supplied to the liquid supply pipe 4 is small and the first flow rate is equal to or smaller than the set flow rate, as compared with a case in which the first flow rate is larger than the set flow rate, it is difficult to supply the liquid L to the hollow fiber membrane module 2. Therefore, when the first flow rate is equal to or smaller than the set flow rate, the opening degree of the control valve 9 is increased and the flow rate of the liquid L supplied to the hollow fiber membrane module 2 is increased as compared with a case in which the first flow rate is larger than the set flow rate. Accordingly, even when the first flow rate is equal to or smaller than the set flow rate, it is possible to suppress a change of a distribution ratio of the flow rate of the liquid L supplied to the hollow fiber membrane module 2 and the flow rate of the liquid L bypassing the hollow fiber membrane module 2.

Further, when the flow rate of the liquid L supplied to the liquid supply pipe 4 is small and the first flow rate is equal to or smaller than the set flow rate, it is difficult to supply the liquid L to the hollow fiber membrane module 2 as the first flow rate decreases. Therefore, when the first flow rate is equal to or smaller than the set flow rate, the opening degree of the control valve 9 is increased and the flow rate of the liquid L supplied to the hollow fiber membrane module 2 is increased as the first flow rate decreases. Accordingly, even when the first flow rate is equal to or smaller than the set flow rate, it is possible to further suppress a change of a distribution ratio of the flow rate of the liquid L supplied to the hollow fiber membrane module 2 and the flow rate of the liquid L bypassing the hollow fiber membrane module 2.

Further, even when the first flow rate is larger than the set flow rate, there is a tendency that the liquid L is not easily supplied to the hollow fiber membrane module 2 as the first flow rate decreases. Therefore, when the first flow rate is larger than the set flow rate, the opening degree of the control valve 9 is increased and the flow rate of the liquid L supplied to the hollow fiber membrane module 2 is increased as the first flow rate decreases. Accordingly, even when the first flow rate is larger than the set flow rate, it is possible to suppress a change of a distribution ratio of the flow rate of the liquid L supplied to the hollow fiber membrane module 2 and the flow rate of the liquid L bypassing the hollow fiber membrane module 2.

Further, a tendency that the liquid L is not easily supplied to the hollow fiber membrane module 2 as the first flow rate decreases increases as the first flow rate is equal to or smaller than the set flow rate. Therefore, when the first flow rate is equal to or smaller than the set flow rate, a ratio of the change rate of the opening degree of the control valve 9 with respect to the change rate of the first flow rate is increased as compared with a case in which the first flow rate is larger than the set flow rate. Accordingly, it is possible to further suppress a change of a distribution ratio of the flow rate of the liquid L supplied to the hollow fiber membrane module 2 and the flow rate of the liquid L bypassing the hollow fiber membrane module 2.

Further, the adjustment gas saturation liquid in which the adjustment gas G is dissolved in the liquid L in a saturated state is produced as the adjustment gas addition liquid L1 by the hollow fiber membrane module 2. Accordingly, it is possible to highly accurately adjust the specific resistance value of the liquid L just by adjusting a distribution ratio of the flow rate of the liquid L supplied to the hollow fiber membrane module 2 and the flow rate of the liquid L bypassing the hollow fiber membrane module 2.

Second Embodiment

Next, a second embodiment will be described. The second embodiment is basically the same as the first embodiment and is different from the first embodiment only in that a second flow rate detection unit is newly provided in a specific resistance value adjustment apparatus. For this reason, hereinafter, only points different from the first embodiment will be described and the same points as those of the first embodiment will not be described.

Figure 3:
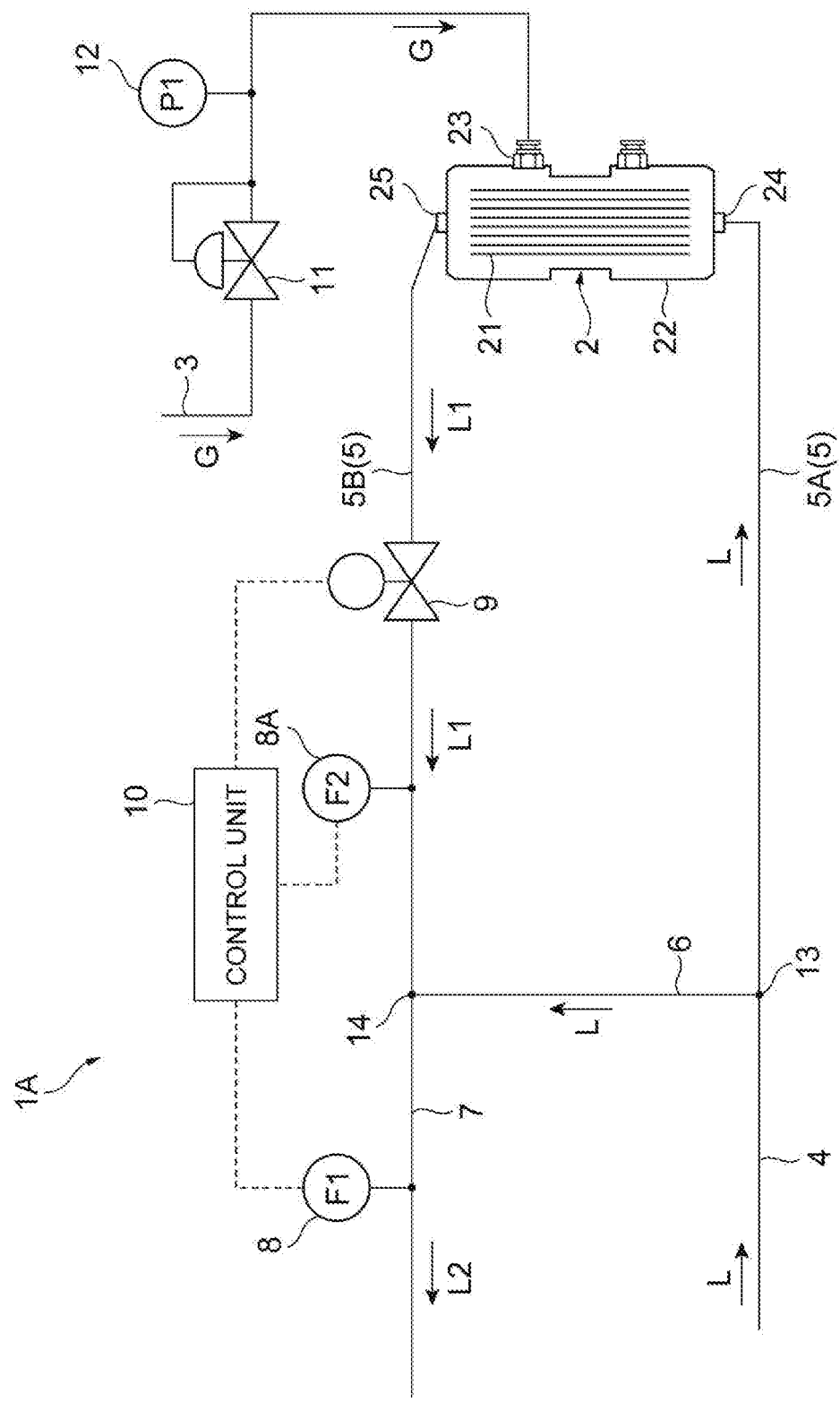
FIG. 3 is a schematic diagram of a specific resistance value adjustment apparatus of a second embodiment.

FIG. 3 is a schematic diagram of a specific resistance value adjustment apparatus of a second embodiment. As illustrated in FIG. 3, a specific resistance value adjustment apparatus 1A of the embodiment includes a hollow fiber membrane module 2, a gas supply pipe 3, a liquid supply pipe 4, a module passing pipe 5, a bypassing pipe 6, a liquid discharge pipe 7, a first flow rate detection unit 8, a control valve 9, a control unit 10, and a second flow rate detection unit 8A.

The second flow rate detection unit 8A detects a flow rate of a liquid flowing through the module passing pipe 5 as a second flow rate. Here, the flow rate of the liquid L flowing through the supply side module passing pipe 5A is the same as the flow rate of the adjustment gas addition liquid L1 flowing through the discharge side module passing pipe 5B. For this reason, the second flow rate detection unit 8A may detect any one of the flow rate of the liquid L flowing through the supply side module passing pipe 5A and the flow rate of the adjustment gas addition liquid L1 flowing through the discharge side module passing pipe 5B as the second flow rate. However, from the viewpoint of lowering the liquid pressure of the liquid L supplied to the hollow fiber membrane module 2, it is desirable to attach the second flow rate detection unit 8A to the discharge side module passing pipe 5B to detect the flow rate of the adjustment gas addition liquid L1 flowing through the discharge side module passing pipe 5B. Furthermore, in the drawings, a case is illustrated in which the second flow rate detection unit 8A is attached to the discharge side module passing pipe 5B and detects the flow rate of the adjustment gas addition liquid L1 flowing through the discharge side module passing pipe 5B. Then, the second flow rate detection unit 8A transmits the information of the detected second flow rate to the control unit 10. As the second flow rate detection unit 8A, various known flowmeters can be employed.

The control unit 10 is electrically connected to the second flow rate detection unit 8A. Then, the control unit 10 corrects the set opening degree of the control valve 9 in response to the information of the second flow rate transmitted from the second flow rate detection unit 8A (the second flow rate detected by the second flow rate detection unit 8A). That is, when the control unit 10 sets the opening degree of the control valve 9 in response to the first flow rate, a specific flow rate of the liquid L corresponding to the opening degree of the control valve 9 flows through the module passing pipe 5. However, actually, there is a case in which the flow rate of the liquid L flowing through the module passing pipe 5 deviates from the specific flow rate corresponding to the opening degree of the control valve 9 due to a change in time or the like of the hollow fiber membrane module 2. Therefore, the control unit 10 first sets the opening degree of the control valve 9 in response to the first flow rate. Then, the control unit 10 corrects the opening degree of the control valve 9 in response to the second flow rate so that the flow rate of the liquid L flowing through the module passing pipe 5 does not deviate from the specific flow rate corresponding to the opening degree of the control valve 9.

In this way, in the embodiment, since the opening degree of the control valve 9 is set in response to the first flow rate of the liquid L supplied to the liquid supply pipe 4 and the opening degree of the control valve 9 is corrected in response to the second flow rate of the liquid flowing through the module passing pipe 5, it is possible to further suppress a change of a distribution ratio of the flow rate of the liquid L supplied to the hollow fiber membrane module 2 and the flow rate of the liquid L bypassing the hollow fiber membrane module 2 even when the flow rate of the liquid L supplied to the liquid supply pipe 4 is small.

Although the embodiments of the invention have been described, the invention is not limited to the above-described embodiments. For example, in the above-described embodiments, a case in which the first flow rate detection unit 8 detects the flow rate of the specific resistance value adjustment liquid L2 flowing through the liquid discharge pipe 7 as the first flow rate has been described, but the flow rate of the liquid L flowing through the liquid supply pipe 4 may be detected as the first flow rate.

EXAMPLES

Next, examples of the invention will be described, but the invention is not limited to the examples below.

Example 1

In Example 1, the specific resistance value adjustment apparatus 1 of the first embodiment illustrated in FIG. 1 was used.

As the liquid L supplied to the liquid supply pipe 4, ultrapure water having a specific resistance value of 18.2 [MΩ·cm] at 25 [° C.] was used. The flow rate of the ultrapure water supplied to the liquid supply pipe 4 was changed from 1 to 15 [L/min]. A flow rate maintaining time for maintaining a constant flow rate was set to 30 seconds and the flow rate was changed gradually. The water pressure of the ultrapure water supplied to the liquid supply pipe 4 was set to 0.2 [MPa].

As the adjustment gas G supplied to the gas supply pipe 3, a carbonic acid gas was used. As a carbonic acid gas supply source, a carbonic acid gas cylinder of 7 [m$^3$] was used. As the pressure adjustment valve 11, a two-stage pressure regulator and a pressure regulating valve were used and a gas pressure of a carbonic acid gas supplied to the gas phase side area of the hollow fiber membrane module 2 was set to 0.1 [MPa].

As the hollow fiber membrane module 2, the hollow fiber membranes 21 formed of poly-4-methylpentene-1 and having an inner diameter of 200 [μm] and an outer diameter of 250 [μm] were bundled and both ends of the bundle of the hollow fiber membranes 21 were consolidated with resin inside the housing 22 of PP resin, thereby obtaining an external perfusion type hollow fiber module (SEPAREL PF-001L manufactured by DIC Corporation) for supplying a gas having a membrane area of 0.5 [m$^2$]. A carbonic acid gas permeation speed of the hollow fiber membrane 21 was 3.5×10$^{-5}$ [cm$^3$/cm$^2$·sec·cmHg].

Then, ultrapure water was supplied to the liquid supply pipe 4 and a carbonic acid gas was supplied to the gas supply pipe 3. The ultrapure water supplied to the liquid supply pipe 4 was distributed by the branch portion 13 to a relatively small flow rate of flow supplied from the supply side module passing pipe 5A to the liquid phase side area of the hollow fiber membrane module 2 and a relatively large flow rate of flow bypassing the hollow fiber membrane module 2 and supplied to the bypassing pipe 6. The carbonic acid gas supplied to the gas supply pipe 3 was adjusted to 0.1 [MPa] by the pressure adjustment valve 11 and was supplied to the gas phase side area of the hollow fiber membrane module 2. In the hollow fiber membrane module 2, the carbonic acid gas permeated the hollow fiber membrane 21 and was dissolved in the ultrapure water flowing to the liquid phase side area so that the ultrapure water became a carbonic acid gas addition ultrapure water having a carbonic acid gas dissolved therein. The carbonic acid gas addition ultrapure water discharged from the hollow fiber membrane module 2 to the discharge side module passing pipe 5B and the ultrapure water flowing through the bypassing pipe 6 were joined to each other by the joint portion 14 to become a specific resistance value adjustment ultrapure water as a target. Then, the specific resistance value adjustment ultrapure water was discharged to the liquid discharge pipe 7.

At this time, the opening degree of the control valve 9 was set by the control unit 10 so that the specific resistance value of the specific resistance value adjustment ultrapure water became 0.7 [MΩ·cm] when the flow rate of the ultrapure water supplied to the liquid supply pipe 4 was 15 [L/min] and the flow rate of the carbonic acid gas addition ultrapure water flowing through the discharge side module passing pipe 5B was adjusted. Then, the flow rate of the ultrapure water supplied to the liquid supply pipe 4 was gradually decreased, the opening degree of the control valve 9 was adjusted in response to the first flow rate, and the specific resistance value of the specific resistance value adjustment ultrapure water at each flow rate was measured.

Example 2

In Example 2, the specific resistance value adjustment apparatus 1 of the first embodiment illustrated in FIG. 1 was used similarly to Example 1.

In the specific resistance value adjustment apparatus 1, the opening degree of the control valve 9 was set by the control unit 10 so that the specific resistance value of the specific resistance value adjustment ultrapure water became 0.5 [MΩ·cm] when the flow rate of the ultrapure water supplied to the liquid supply pipe 4 was 15 [L/min] and the flow rate of the carbonic acid gas addition ultrapure water flowing through the discharge side module passing pipe 5B was adjusted. The other conditions were the same as those of Example 1. Then, the flow rate of the ultrapure water supplied to the liquid supply pipe 4 was gradually decreased, the opening degree of the control valve 9 was adjusted in response to the first flow rate, and the specific resistance value of the specific resistance value adjustment ultrapure water at each flow rate was measured.

Example 3

In Example 3, the specific resistance value adjustment apparatus 1 of the first embodiment illustrated in FIG. 1 was used similarly to Example 1.

In the specific resistance value adjustment apparatus 1, the opening degree of the control valve 9 was set by the control unit 10 so that the specific resistance value of the specific resistance value adjustment ultrapure water became 0.3 [MΩ·cm] when the flow rate of the ultrapure water supplied to the liquid supply pipe 4 was 15 [L/min] and the flow rate of the carbonic acid gas addition ultrapure water flowing through the discharge side module passing pipe 5B was adjusted. The other conditions were the same as those of Example 1. Then, the flow rate of the ultrapure water supplied to the liquid supply pipe 4 was gradually decreased, the opening degree of the control valve 9 was adjusted in response to the first flow rate, and the specific resistance value of the specific resistance value adjustment ultrapure water at each flow rate was measured.

Comparative Example 1

Figure 4:
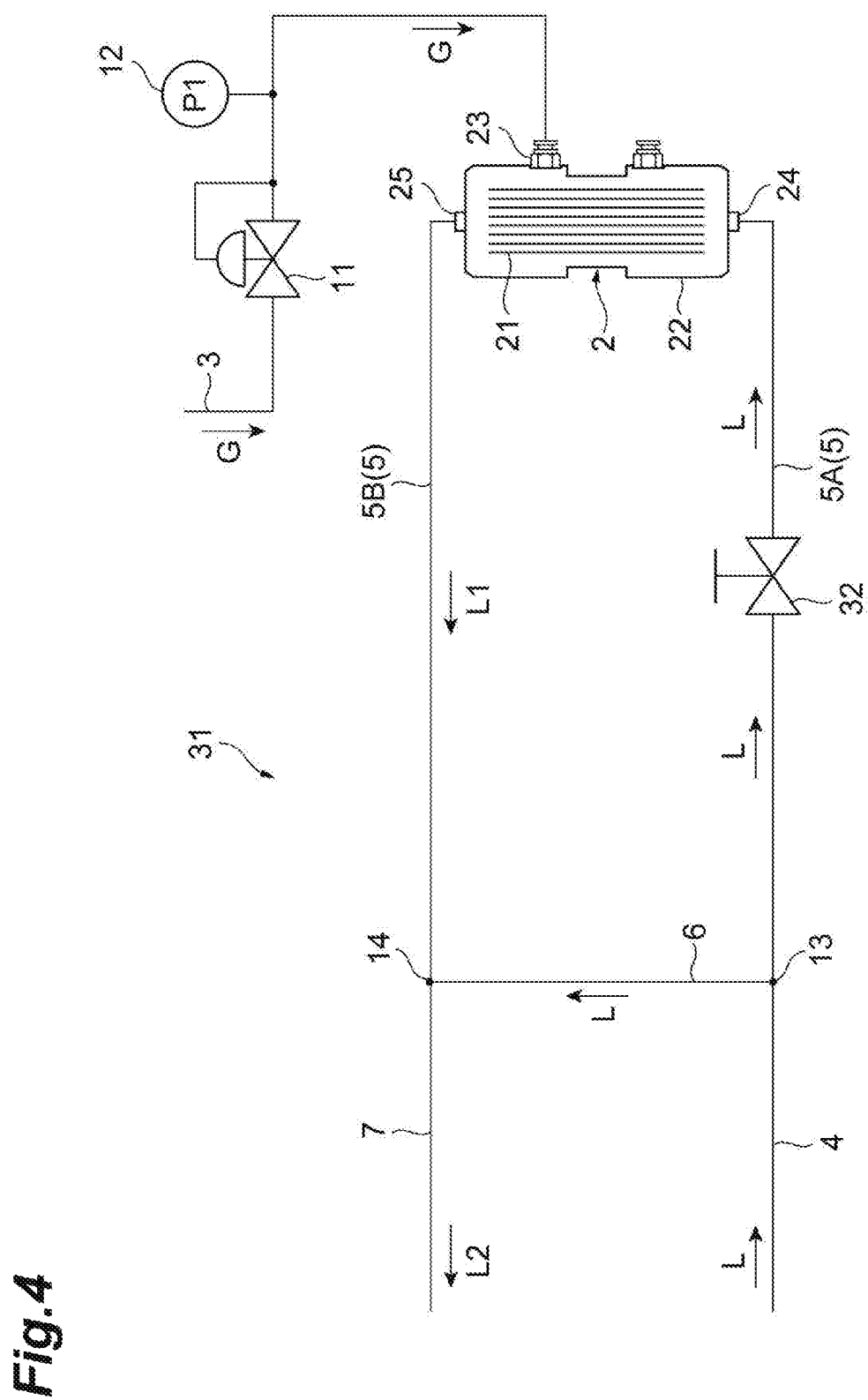
FIG. 4 is a schematic diagram of a confluence device of a comparative example.

In Comparative Example 1, the specific resistance value adjustment apparatus 31 illustrated in FIG. 4 was used.

The specific resistance value adjustment apparatus 31 is basically the same as the specific resistance value adjustment apparatus 1 (see FIG. 1) and is different from the specific resistance value adjustment apparatus 1 only in that a flow rate adjustment valve 32 is provided instead of the first flow rate detection unit 8, the control valve 9, and the control unit 10. The flow rate adjustment valve 32 is a flow rate adjustment valve which opens and closes the flow passage of the supply side module passing pipe 5A and manually adjusts the opening degree. For this reason, the flow rate adjustment valve 32 manually adjusts the flow rate of the liquid L flowing through the supply side module passing pipe 5A.

In the specific resistance value adjustment apparatus 31, the flow rate of the ultrapure water flowing through the supply side module passing pipe 5A was adjusted by the flow rate adjustment valve 32 so that the specific resistance value of the specific resistance value adjustment ultrapure water became 0.7 [MΩ·cm] when the flow rate of the ultrapure water supplied to the liquid supply pipe 4 was 15 [L/min] similarly to Example 1. The other conditions were the same as those of Example 1. Then, the flow rate of the ultrapure water supplied to the liquid supply pipe 4 was gradually decreased and the specific resistance value of the specific resistance value adjustment ultrapure water at each flow rate was measured.

Comparative Example 2

In Comparative Example 2, the specific resistance value adjustment apparatus 31 illustrated in FIG. 4 was used similarly to Comparative Example 1.

In the specific resistance value adjustment apparatus 31, the flow rate of the ultrapure water flowing through the supply side module passing pipe 5A was adjusted by the flow rate adjustment valve 32 so that the specific resistance value of the specific resistance value adjustment ultrapure water became 0.5 [MΩ·cm] when the flow rate of the ultrapure water supplied to the liquid supply pipe 4 was 15 [L/min] The other conditions were the same as those of Example 1. Then, the flow rate of the ultrapure water supplied to the liquid supply pipe 4 was gradually decreased and the specific resistance value of the specific resistance value adjustment ultrapure water at each flow rate was measured.

Comparative Example 3

In Comparative Example 3, the specific resistance value adjustment apparatus 31 illustrated in FIG. 4 was used similarly to Comparative Example 1.

In the specific resistance value adjustment apparatus 31, the flow rate of the ultrapure water flowing through the supply side module passing pipe 5A was adjusted by the flow rate adjustment valve 32 so that the specific resistance value of the specific resistance value adjustment ultrapure water became 0.3 [MΩ·cm] when the flow rate of the ultrapure water supplied to the liquid supply pipe 4 was 15 [L/min]. The other conditions were the same as those of Example 1. Then, the flow rate of the ultrapure water supplied to the liquid supply pipe 4 was gradually decreased and the specific resistance value of the specific resistance value adjustment ultrapure water at each flow rate was measured.

Evaluation 1

Figure 5:
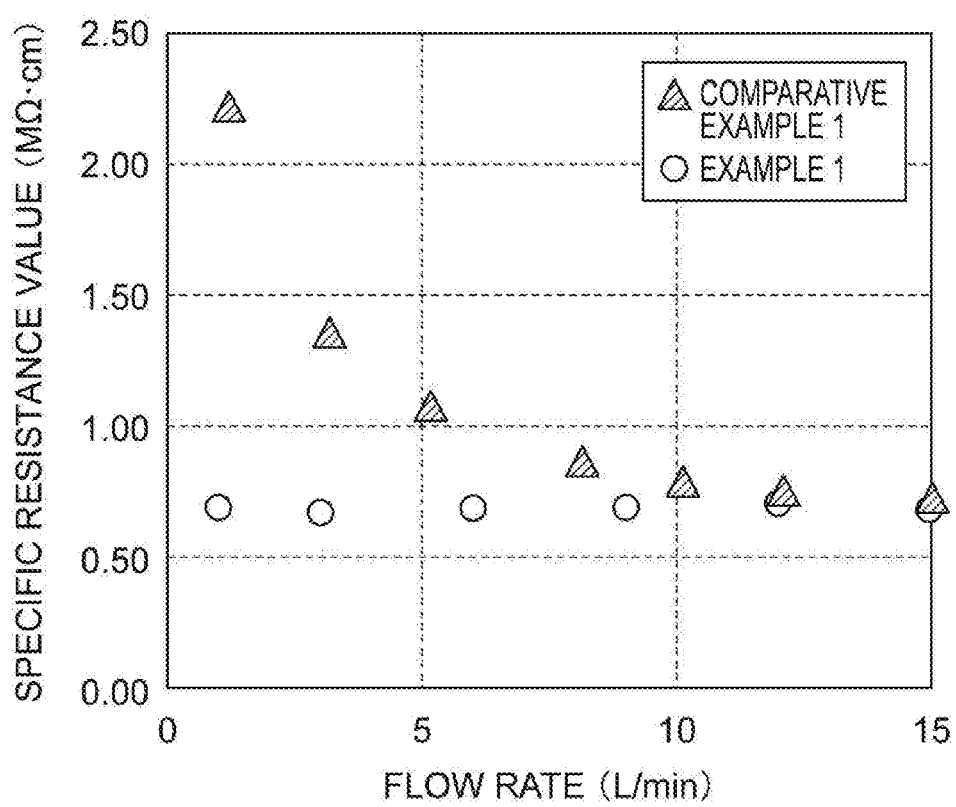
FIG. 5 is a diagram showing measurement results of Example 1 and Comparative Example 1.
Figure 6:
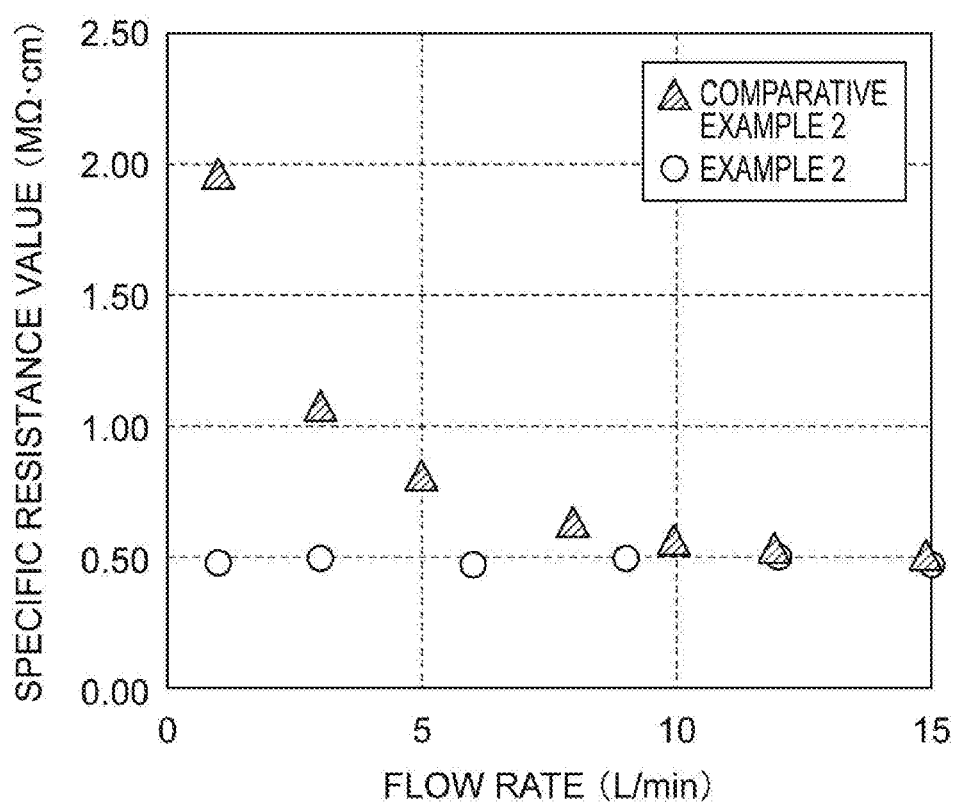
FIG. 6 is a diagram showing measurement results of Example 2 and Comparative Example 2.
Figure 7:
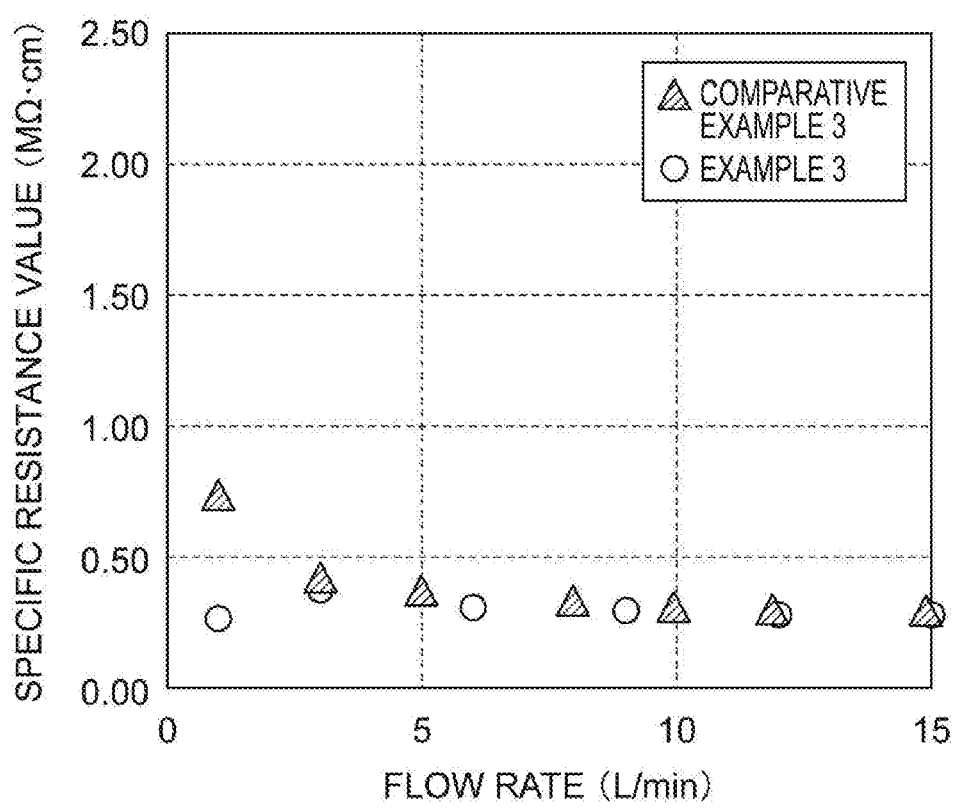
FIG. 7 is a diagram showing measurement results of Example 3 and Comparative Example 3.

FIG. 5 shows measurement results of Example 1 and Comparative Example 1, FIG. 6 shows measurement results of Example 2 and Comparative Example 2, and FIG. 7 shows measurement results of Example 3 and Comparative Example 3. In FIGS. 5 to 7, a horizontal axis indicates the flow rate of the ultrapure water supplied to the liquid supply pipe 4 and a vertical axis indicates the specific resistance value of the specific resistance value adjustment ultrapure water.

As shown in FIGS. 5 to 7, when the flow rate of the ultrapure water was large, there was no big difference in the specific resistance value in Examples 1 to 3 and Comparative Examples 1 to 3. Meanwhile, as the flow rate of the ultrapure water decreased, the specific resistance value largely increased in Comparative Examples 1 to 3, but an increase in specific resistance value was suppressed in Examples 1 to 3.

From such a result, it was found that an increase in specific resistance value of ultrapure water could be suppressed even when the flow rate of the ultrapure water was small by setting the opening degree of the control valve 9 in response to the flow rate of the ultrapure water supplied to the liquid supply pipe 4.

Example 4

In Example 4, the specific resistance value adjustment apparatus 1 of the first embodiment illustrated in FIG. 1 was used similarly to Example 1.

In the specific resistance value adjustment apparatus 1, the opening degree of the control valve 9 was set by the control unit 10 so that the specific resistance value of the specific resistance value adjustment ultrapure water became 0.7 [MΩ·cm] when the flow rate of the ultrapure water supplied to the liquid supply pipe 4 was 15 [L/min] and hence the flow rate of the carbonic acid gas addition ultrapure water flowing through the discharge side module passing pipe 5B was adjusted. The other conditions were the same as those of Example 1.

Then, the flow rate of the ultrapure water supplied to the liquid supply pipe 4 was changed between 15 [L/min] and 1 [L/min] at the interval of 3 minutes and a change in specific resistance value of the specific resistance value adjustment ultrapure water with time was measured.

Example 5

In Example 5, the specific resistance value adjustment apparatus 1 of the first embodiment illustrated in FIG. 1 was used similarly to Example 1.

In the specific resistance value adjustment apparatus 1, the opening degree of the control valve 9 was set by the control unit 10 so that the specific resistance value of the specific resistance value adjustment ultrapure water became 0.5 [MΩ·cm] when the flow rate of the ultrapure water supplied to the liquid supply pipe 4 was 15 [L/min] and hence the flow rate of the carbonic acid gas addition ultrapure water flowing through the discharge side module passing pipe 5B was adjusted. The other conditions were the same as those of Example 1.

Then, the flow rate of the ultrapure water supplied to the liquid supply pipe 4 was changed between 15 [L/min] and 1 [L/min] at the interval of 3 minutes and a change in specific resistance value of the specific resistance value adjustment ultrapure water with time was measured.

Example 6

In Example 6, the specific resistance value adjustment apparatus 1 of the first embodiment illustrated in FIG. 1 was used similarly to Example 1.

In the specific resistance value adjustment apparatus 1, the opening degree of the control valve 9 was set by the control unit 10 so that the specific resistance value of the specific resistance value adjustment ultrapure water became 0.3 [MΩ·cm] when the flow rate of the ultrapure water supplied to the liquid supply pipe 4 was 15 [L/min] and hence the flow rate of the carbonic acid gas addition ultrapure water flowing through the discharge side module passing pipe 5B was adjusted. The other conditions were the same as those of Example 1.

Then, the flow rate of the ultrapure water supplied to the liquid supply pipe 4 was changed between 15 [L/min] and 1 [L/min] at the interval of 3 minutes and a change in specific resistance value of the specific resistance value adjustment ultrapure water with time was measured.

Comparative Example 4

In Comparative Example 4, the specific resistance value adjustment apparatus 31 illustrated in FIG. 4 was used similarly to Comparative Example 1.

In the specific resistance value adjustment apparatus 31, the flow rate of the ultrapure water flowing through the supply side module passing pipe 5A was adjusted by the flow rate adjustment valve 32 so that the specific resistance value of the specific resistance value adjustment ultrapure water became 0.7 [MΩ·cm] wen the flow rate of the ultrapure water supplied to the liquid supply pipe 4 was 15 [L/min] similarly to Example 4. The other conditions were the same as those of Example 1. Then, the flow rate of the ultrapure water supplied to the liquid supply pipe 4 was changed between 15 [L/min] and 1 [L/min] at the interval of 3 minutes and a change in specific resistance value of the specific resistance value adjustment ultrapure water with time was measured.

Comparative Example 5

In Comparative Example 5, the specific resistance value adjustment apparatus 31 illustrated in FIG. 4 was used similarly to Comparative Example 1.

In the specific resistance value adjustment apparatus 31, the flow rate of the ultrapure water flowing through the supply side module passing pipe 5A was adjusted by the flow rate adjustment valve 32 so that the specific resistance value of the specific resistance value adjustment ultrapure water became 0.5 [MΩ·cm] when the flow rate of the ultrapure water supplied to the liquid supply pipe 4 was 15 [L/min] similarly to Example 5. The other conditions were the same as those of Example 1. Then, the flow rate of the ultrapure water supplied to the liquid supply pipe 4 was changed between 15 [L/min] and 1 [L/min] at the interval of 3 minutes and a change in specific resistance value of the specific resistance value adjustment ultrapure water with time was measured.

Comparative Example 6

In Comparative Example 6, the specific resistance value adjustment apparatus 31 illustrated in FIG. 4 was used similarly to Comparative Example 1.

In the specific resistance value adjustment apparatus 31, the flow rate of the ultrapure water flowing through the supply side module passing pipe 5A was adjusted by the flow rate adjustment valve 32 so that the specific resistance value of the specific resistance value adjustment ultrapure water became 0.3 [MΩ·cm] when the flow rate of the ultrapure water supplied to the liquid supply pipe 4 was 15 [L/min] similarly to Example 6. The other conditions were the same as those of Example 1. Then, the flow rate of the ultrapure water supplied to the liquid supply pipe 4 was changed between 15 [L/min] and 1 [L/min] at the interval of 3 minutes and a change in specific resistance value of the specific resistance value adjustment ultrapure water with time was measured.

(Evaluation 2)

FIG. 8($a$) and FIG. 8($b$) show a measurement result of Example 4, FIG. 9($a$) and FIG. 9($b$) show a measurement result of Comparative Example 4, FIG. 10($a$) and FIG. 10($b$) show a measurement result of Example 5, FIG. 11($a$) and FIG. 11($b$) show a measurement result of Comparative Example 5, FIG. 12($a$) and FIG. 12($b$) show a measurement result of Example 6, and FIG. 13($a$) and FIG. 13($b$) show a measurement result of Comparative Example 6. FIGS. 8($a$), 9($a$), 10($a$), 11($a$), 12($a$), and 13($a$) show a relationship between an elapse time and a specific resistance value. In FIGS. 8($a$), 9($a$), 10($a$), 11($a$), 12($a$), and 13($a$), a horizontal axis indicates the elapse time from the start of the measurement and a vertical axis indicates the specific resistance value of the specific resistance value adjustment ultrapure water. FIGS. 8($b$), 9($b$), 10($b$), 11($b$), 12($b$), and 13($b$) show a relationship between an elapse time and a flow rate. In FIGS. 8($b$), 9($b$), 10($b$), 11($b$), 12($b$), and 13($b$), a horizontal axis indicates the elapse time from the start of the measurement and a vertical axis indicates the flow rate of the ultrapure water supplied to the liquid supply pipe 4.

As shown in FIG. 9($a$) and FIG. 9($b$), 11($a$) and FIGS. 11($b$), and 13($a$) and FIG. 13($b$), in Comparative Examples 4 to 6, the specific resistance value largely increased when the flow rate of the ultrapure water supplied to the liquid supply pipe 4 was changed from 15 [L/min] to 1 [L/min]. Further, a long time was necessary until the specific resistance value was stabilized after the flow rate of the ultrapure water supplied to the liquid supply pipe 4 was changed from 15 [L/min] to 1 [L/min].

As shown in FIG. 8($a$) and FIG. 8($b$), 10($a$) and FIGS. 10($b$), and 12($a$) and FIG. 12($b$), in Examples 4 to 6, the specific resistance value substantially did not increase even when the flow rate of the ultrapure water supplied to the liquid supply pipe 4 was changed from 15 [L/min] to 1 [L/min]. Meanwhile, when the flow rate of the ultrapure water supplied to the liquid supply pipe 4 was changed from 1 [L/min] to 15 [L/min], the specific resistance value increased. However, this increase degree was very small as compared with an increase degree of the specific resistance value when the flow rate of the ultrapure water supplied to the liquid supply pipe 4 was changed from 15 [L/min] to 1 [L/min] in Comparative Examples 4 to 6. Further, the specific resistance value was stabilized in a short time after the flow rate of the ultrapure water supplied to the liquid supply pipe 4 was changed from 1 [L/min] to 15 [L/min].

From such a result, it was found that an increase in specific resistance value of ultrapure water in accordance with a change of the flow rate of the ultrapure water supplied to the liquid supply pipe 4 could be suppressed just by setting the opening degree of the control valve 9 in response to the flow rate of the ultrapure water supplied to the liquid supply pipe 4.

REFERENCE SIGNS LIST

1: specific resistance value adjustment apparatus, 1A: specific resistance value adjustment apparatus, 2: hollow fiber membrane module, 3: gas supply pipe, 4: liquid supply pipe, 5: module passing pipe, 5A: supply side module passing pipe, 5B: discharge side module passing pipe, 6: bypassing pipe, 7: liquid discharge pipe, 8: first flow rate detection unit, 8A: second flow rate detection unit, 9: control valve, 10: control unit, 11: pressure adjustment valve, 12: pressure gauge, 13: branch portion, 14: joint portion, 21: hollow fiber membrane, 22: housing, 23: gas supply port, 24: liquid supply port, 25: liquid discharge port, 31: specific resistance value adjustment apparatus, 32: flow rate adjustment valve, A1: first flow rate range, A2: second flow rate range, A3: third flow rate range, G: adjustment gas, L: liquid, L1: adjustment gas addition liquid, L2: specific resistance value adjustment liquid.

The invention claimed is:

1. A specific resistance value adjustment apparatus comprising:
   a hollow fiber membrane module having a configuration in which a liquid phase side area to which an ultrapure water is supplied and a gas phase side area to which an adjustment gas for adjusting a specific resistance value of the ultrapure water is supplied is divided by a hollow fiber membrane and the adjustment gas permeating the hollow fiber membrane is dissolved in the ultrapure water to produce an adjustment gas addition liquid in which the adjustment gas is dissolved in the ultrapure water;
   a gas supply pipe which supplies the adjustment gas to the hollow fiber membrane module;
   a liquid supply pipe to which the ultrapure water is supplied;
   a module passing pipe which communicates with the liquid supply pipe through a branch portion branching the liquid supply pipe and passes through the hollow fiber membrane module;
   a bypassing pipe which communicates with the liquid supply pipe through the branch portion and bypasses the hollow fiber membrane module;
   a liquid discharge pipe which communicates with the module passing pipe and the bypassing pipe through a joint portion in which the module passing pipe and the bypassing pipe are joined to each other at a downstream side of the hollow fiber membrane module;
   a first flow rate detection unit which detects a first flow rate of the ultrapure water supplied to the liquid supply pipe;
   a control valve which opens and closes the module passing pipe; and
   a control unit which sets an opening degree of the control valve in response to the first flow rate detected by the first flow rate detection unit,
   wherein the module passing pipe includes a supply side module passing pipe which is disposed at an upstream side of the hollow fiber membrane module and supplies the ultrapure water to the hollow fiber membrane module and a discharge side module passing pipe which is disposed at a downstream side of the hollow fiber membrane module and discharges the adjustment gas addition liquid from the hollow fiber membrane module,
   wherein the control valve is attached to the discharge side module passing pipe and opens and closes the discharge side module passing pipe, and
   wherein the first flow rate detection unit detects a flow rate of the ultrapure water flowing through the liquid discharge pipe as the first flow rate.

2. The specific resistance value adjustment apparatus according to claim 1, further comprising:
   a second flow rate detection unit which detects a second flow rate of the ultrapure water flowing through the module passing pipe,
   wherein the control unit corrects the opening degree in response to the second flow rate detected by the second flow rate detection unit.

3. The specific resistance value adjustment apparatus according to claim 1,
   wherein when the first flow rate is equal to or smaller than a set flow rate, the control unit increases the opening degree as compared with a case in which the first flow rate is larger than the set flow rate.

4. The specific resistance value adjustment apparatus according to claim 3,
   wherein when the first flow rate is equal to or smaller than the set flow rate, the control unit increases the opening degree as the first flow rate decreases.

5. The specific resistance value adjustment apparatus according to claim 4,
   wherein when the first flow rate is larger than the set flow rate, the control unit increases the opening degree as the first flow rate decreases.

6. The specific resistance value adjustment apparatus according to claim 5,
   wherein when the first flow rate is equal to or smaller than the set flow rate, the control unit increases a ratio of a change rate of the opening degree with respect to a change rate of the first flow rate as compared with a case in which the first flow rate is larger than the set flow rate.

7. The specific resistance value adjustment apparatus according to claim 1,
   wherein the adjustment gas addition liquid is an adjustment gas saturation liquid in which the adjustment gas is dissolved in the ultrapure water in a saturated state.

8. A specific resistance value adjustment method using the specific resistance value adjustment apparatus according to claim 1, comprising:
   supplying the ultrapure water to a liquid supply pipe;
   distributing the ultrapure water supplied to the liquid supply pipe to a module passing pipe passing through the hollow fiber membrane module and a bypassing pipe bypassing the hollow fiber membrane module;
   producing the adjustment gas addition liquid in which the adjustment gas is dissolved in the ultrapure water in a saturated state in the hollow fiber membrane module by supplying the adjustment gas to the hollow fiber membrane module;
   joining the adjustment gas addition liquid produced by the hollow fiber membrane module to the ultrapure water bypassing the hollow fiber membrane module and discharging a resultant liquid to a liquid discharge pipe; and
   setting an opening degree of a control valve opening and closing the module passing pipe in response to a first flow rate of the ultrapure water supplied to the liquid supply pipe.

9. The specific resistance value adjustment method according to claim 8,
   wherein when the first flow rate is equal to or smaller than a set flow rate, the opening degree is increased as compared with a case in which the first flow rate is larger than the set flow rate.

10. The specific resistance value adjustment method according to claim 8, wherein a second flow rate of the ultrapure water flowing through the module passing pipe is detected and the opening degree is corrected in response to the second flow rate.

11. The specific resistance value adjustment method according to claim 8,
wherein when the first flow rate is equal to or smaller than the set flow rate, the opening degree is increased as compared with a case in which the first flow rate is larger than the set flow rate, the opening degree is increased as the first flow rate decreases, and a ratio of a change rate of the opening degree with respect to a change rate of the first flow rate is increased as compared with a case in which the first flow rate is larger than the set flow rate, and
wherein when the first flow rate is larger than the set flow rate, the opening degree is increased as the first flow rate decreases.

* * * * *